United States Patent
Ishida et al.

(10) Patent No.: US 10,857,548 B2
(45) Date of Patent: Dec. 8, 2020

(54) MAGNETIC SEPARATOR, MAGNETIC SEPARATION METHOD, AND IRON SOURCE MANUFACTURING METHOD

(71) Applicant: JFE STEEL CORPORATION, Tokyo (JP)

(72) Inventors: Kyohei Ishida, Tokyo (JP); Yuki Takaki, Tokyo (JP)

(73) Assignee: JFE STEEL CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/778,225

(22) PCT Filed: Nov. 30, 2016

(86) PCT No.: PCT/JP2016/085631
§ 371 (c)(1),
(2) Date: May 23, 2018

(87) PCT Pub. No.: WO2017/094803
PCT Pub. Date: Jun. 8, 2017

(65) Prior Publication Data
US 2018/0353969 A1 Dec. 13, 2018

(30) Foreign Application Priority Data
Nov. 30, 2015 (WO) .................. PCT/JP2015/005947

(51) Int. Cl.
*B03C 1/20* (2006.01)
*B03C 1/22* (2006.01)
(Continued)

(52) U.S. Cl.
CPC .................. *B03C 1/20* (2013.01); *B03B 9/04* (2013.01); *B03C 1/00* (2013.01); *B03C 1/18* (2013.01); *B03C 1/22* (2013.01); *Y02P 10/20* (2015.11)

(58) Field of Classification Search
CPC .... B03C 1/18; B03C 1/20; B03C 1/24; B03C 1/247; B03C 2201/22; B03C 1/00; B03C 1/22; B03B 9/04
(Continued)

(56) References Cited

U.S. PATENT DOCUMENTS 2,272,719 A * 2/1942 Maynard ................... B03C 1/12
209/219
2,992,733 A * 7/1961 Buus ......................... B03C 1/12
209/219
(Continued)

FOREIGN PATENT DOCUMENTS

CN 102000629 A 4/2011
CN 104736249 A 6/2015
(Continued)

OTHER PUBLICATIONS

English Translation of JP 2013063423 A; Pub Date: Apr. 2013; INV: Naoe Tekko (Year: 2013).*
(Continued)

*Primary Examiner* — Joseph C Rodriguez
(74) *Attorney, Agent, or Firm* — Kenja IP Law PC

(57) ABSTRACT

A magnetic separator comprises: at least one pair of guide rolls; and a conveyor belt that extends between the pair of guide rolls, and conveys a powdery and/or granular material containing ferromagnetic particles, wherein one guide roll of the pair of guide rolls is a hollow roll, and includes, in a hollow part thereof, a magnet roll including a plurality of magnets that are arranged along an inner peripheral surface of the guide roll in lines at intervals so that different magnetic poles alternate in a circumferential direction, and the magnetic separator further comprises a shield wall that covers a circular arc region of an outer peripheral surface of the guide roll except a circular arc region around which the
(Continued)

conveyor belt is wound, to block magnetic lines of force from the plurality of magnets.

18 Claims, 16 Drawing Sheets

(51) Int. Cl.
  *B03C 1/00* (2006.01)
  *B03C 1/18* (2006.01)
  *B03B 9/04* (2006.01)

(58) Field of Classification Search
  USPC .......................................................... 209/219
  See application file for complete search history.

(56) References Cited

U.S. PATENT DOCUMENTS

| | | | | |
|---|---|---|---|---|
| 3,454,913 | A * | 7/1969 | Israelson | B03C 1/14 335/306 |
| 4,318,804 | A * | 3/1982 | Nakajima | B03C 1/247 209/221 |
| 5,101,980 | A * | 4/1992 | Arvidson | B65G 23/44 198/807 |
| 5,207,330 | A * | 5/1993 | Siesco, Jr. | B03C 1/247 209/212 |
| 5,494,172 | A * | 2/1996 | Siesco, Jr. | B03C 1/247 209/212 |
| 6,338,903 | B1 * | 1/2002 | Takigawa | B03C 1/12 209/217 |
| 6,540,088 | B2 * | 4/2003 | Oder | B03C 1/02 209/128 |
| 6,634,504 | B2 * | 10/2003 | Robinson | B03C 1/00 209/214 |
| 9,010,538 | B2 * | 4/2015 | Smolkin | B03C 1/18 209/219 |
| 9,962,710 | B2 * | 5/2018 | Suderman | H01F 7/0268 |
| 2013/0264248 | A1 | 10/2013 | Smolkin et al. | |

FOREIGN PATENT DOCUMENTS

| | | |
|---|---|---|
| EP | 2910309 A1 | 8/2015 |
| JP | H10130041 A | 5/1998 |
| JP | H10165838 A | 6/1998 |
| JP | 2001121028 A | 5/2001 |
| JP | 2002331257 A | 11/2002 |
| JP | 2006142136 A | 6/2006 |
| JP | 2013063423 A | 4/2013 |
| KR | 1020150058475 A | 5/2015 |
| WO | 2014061256 A1 | 4/2014 |

OTHER PUBLICATIONS

English Translation of WO 2014061256 A1; Pub Date: Apr. 2014; INV: Ishida et al. (Year: 2014).*

Nov. 2, 2018, the Extended European Search Report issued by the European Patent Office in the corresponding European Patent Application No. 16870740.4.

Jan Svoboda, Magnetic Techniques for the Treatment of Materials, 2004, pp. 70-72, Kluwer Academic Publishers.

Jan. 17, 2017, International Search Report issued in the International Patent Application No. PCT/JP2016/085631.

Jan. 9, 2018, Notification of Reasons for Refusal issued by the Japanese Patent Office in the corresponding Japanese Patent Application No. 2017-505683, with English language Concise Statement of Relevance.

Apr. 28, 2019, Office Action issued by the State Intellectual Property Office in the corresponding Chinese Patent Application No. 201680069413.2 with English language search report.

May 13, 2019, Office Action issued by the IP Australia in the corresponding Australian Patent Application No. 2016362141.

Oct. 1, 2019, Office Action issued by the Korean Intellectual Property Office in the corresponding Korean Patent Application No. 10-2018-7014666 with English language concise statement of relevance.

Feb. 28, 2020, Office Action issued by the Canadian Intellectual Property Office in the corresponding Canadian Patent Application No. 3,002,928.

May 6, 2020, Office Action issued by the China National Intellectual Property Administration in the corresponding Chinese Patent Application No. 201680069413.2 with English language concise statement of relevance.

* cited by examiner

▲ Ferromagnetic particle $a_1$
○ Non-magnetic particle $a_2$

MAGNETIC SEPARATOR, MAGNETIC SEPARATION METHOD, AND IRON SOURCE MANUFACTURING METHOD

TECHNICAL FIELD

The present disclosure relates to a technique of magnetically separating ferromagnetic particles from a powdery and/or granular material containing ferromagnetic particles. The present disclosure particularly relates to a magnetic separator and a magnetic separation method suitable for, for example, separating iron from slag which is a by-product of a steelmaking process, and an iron source manufacturing method.

BACKGROUND

In a steelmaking process, slag (steelmaking slag) is produced as a by-product in hot metal pretreatment or converter decarburization. Slag is a product of a reaction between a calcium-based additive, which is added to remove impurities or unwanted elements in hot metal or molten steel, and the impurities or unwanted elements. The slag contains a large amount of iron, in addition to the removed impurities and unwanted elements.

To recycle iron in such slag, separation and recovery of iron are performed. Iron is typically separated and recovered according to the following process. First, the slag is put through a sieve, to remove large lumps (several hundred mm in diameter) contained in the slag. Small lumps that have passed through the sieve have iron and slag sticking together, and therefore are subjected to rough crushing using a hammer crusher, a rod mill, or the like to several 10 μm to several 10 mm in size, thus facilitating liberation (i.e. separation of slag and iron). After this, iron is separated using a magnetic separator. As the magnetic separator, suspended electromagnet type, magnetic drum separator type, magnetic pulley type, or the like is typically used.

In some cases, the slag is heated and then cooled for an appropriate time before being crushed, in order to liberate iron. Depending on the cooling time, it is possible to separate only the stuck slag without crushing the iron lumps, or pulverize the slag to about several 10 μm. With either method, liberation is promoted as the slag is more pulverized.

In general, liberation needs to be promoted in order to improve the iron recovery rate. Accordingly, mechanical crushing is repeatedly performed to reduce the particle size of the slag, or heat treatment is performed to reduce the particle size.

FIG. 1 is a diagram illustrating an example of a conventional magnetic separator used in the case of performing magnetic separation for recovery of iron (for example, J. Svoboda, Magnetic Techniques for the Treatment of Materials, pp. 70-72, Kluwer Academic Publishers, 2004 (NPL 1)). This is a magnetic separator of magnetic pulley type (belt conveyor type). The device supplies a powdery and/or granular material a containing ferromagnetic particles and non-magnetic particles from a supply device 100 onto a conveyor belt 101 and, when discharging the powdery and/or granular material a from a conveyor end portion 102, separates the ferromagnetic particles and the non-magnetic particles. In the device, a guide roll 103 on the conveyor end portion 102 side has a hollow structure, and a plurality of magnets 104 face a circular arc portion of the inner peripheral wall of the guide roll 103. The magnets 104 are arranged so that magnetic poles adjacent in the circumferential direction of the inner peripheral wall of the guide roll 103 differ in magnetic property. The magnets 104 are stationary magnets installed independently away from the inner peripheral wall of the guide roll 103.

This magnetic separator has the following structure: In the conveyor end portion 102, the magnetic force of the magnets 104 inside the guide roll 103 acts on the powdery and/or granular material a on the conveyor belt 101. As a result, the non-magnetic particles not attracted to the magnets 104 fall first, and are collected in a non-magnetically attracted matter recovery portion 105. Meanwhile, the ferromagnetic particles attracted to the magnets 104 pass over a partition plate 106 provided below the guide roll 103, fall at a position where the magnetic force weakens, and are collected in a magnetically attracted matter recovery portion 107.

CITATION LIST

Patent Literatures

PTL 1: JP 2006-142136 A
PTL 2: JP H10-130041 A

Non Patent Literatures

NPL 1: J. Svoboda, Magnetic Techniques for the Treatment of Materials, pp. 70-72, Kluwer Academic Publishers, 2004

SUMMARY

Technical Problem

However, in the case where the powdery and/or granular material a is supplied in a large amount to the conventional magnetic separator illustrated in FIG. 1 and the layer of the powdery and/or granular material a is thick, the following problem arises. In the atomized powdery and/or granular material a, the ferromagnetic particles embrace the non-magnetic particles. The ferromagnetic particles and the non-magnetic particles are therefore attracted together to the magnets 104, and are hard to be separated. This is more noticeable when the particle size of the powdery and/or granular material a is smaller. In the case where the powdery and/or granular material a forms a thick layer on the conveyor belt 101 due also to its flocculation phenomenon resulting from atomization, the non-magnetic particles enter the magnetically attracted matter recovery portion 107 together with the ferromagnetic particles as illustrated in FIG. 1. This makes it impossible to appropriately separate the ferromagnetic particles.

Such a problem needs to be typically dealt with by, for example, reducing the supply amount of the powdery and/or granular material a using a vibrating feeder 108 or the like to reduce the thickness of the powdery and/or granular material layer on the conveyor belt 101 to a thickness corresponding to about one to two particles, as illustrated in FIG. 2. Reducing the supply amount of the powdery and/or granular material a certainly ensures the performance of separating the ferromagnetic particles, but causes a decrease in processing speed. In magnetic separation for slag, several tons to several tens of tons need to be processed per hour, and so it is essential to perform magnetic separation for a large amount in a short time. The conventional magnetic separator mentioned above thus has difficulty in magnetic separation of a large amount of powdery and/or granular material a in a short time.

JP 2006-142136 A (PTL 1) proposes a method of separating foreign matter without excessively crushing slag by performing a plurality of specific processes. This is, however, a complex separation procedure, and requires high processing cost. Although a wet process is usually applied to avoid flocculation as described in JP H10-130041 A (PTL 2), enormous liquid waste disposal cost is required.

It could be helpful to provide a magnetic separator and a magnetic separation method that can, even in the case where a powdery and/or granular material containing ferromagnetic particles is processed in a large amount or the layer of the supplied powdery and/or granular material is thick, efficiently separate the ferromagnetic particles from the powdery and/or granular material by magnetic separation at low cost without requiring complex processes or liquid waste disposal.

It could also be helpful to solve the following problem specific to the magnetic separator of belt conveyor type illustrated in FIGS. 1 and 2. In the magnetic separator of belt conveyor type, in the case where ferromagnetic particles such as an iron powder adhere to the inside of the conveyor belt for some reason, the ferromagnetic particles are attracted and adhere to the magnet installation portion of the guide roll. In the case where ferromagnetic particles flying through the air come near the guide roll, too, the ferromagnetic particles are directly attracted and adhere to the magnet installation portion. Once such ferromagnetic particles have been attracted and adhered to the guide roll, the ferromagnetic particles are kept sandwiched between the belt and the guide roll. This significantly decreases the life of the belt. Besides, in the magnetic separator, an eddy current is induced in the attracted ferromagnetic particles themselves and the temperature of the attracted ferromagnetic particles rises. This also significantly decreases the life of the belt.

In the concentric structure illustrated in FIGS. 1 and 2 where the rotational axis of the guide roll and the rotational axis of the belt pulley match, it is difficult to prevent the adhesion of ferromagnetic particles, and the ferromagnetic particles need to be manually removed on a regular basis. Given that the atomization of ferromagnetic particles is advantageous in facilitating separation and the atomization of ferromagnetic particles supplied in the magnetic separator of belt conveyor type illustrated in FIGS. 1 and 2 is pursued, there is a need to solve the problem of the adhesion of ferromagnetic particles.

Solution to Problem

First, the discoveries concerning magnetic separation that led to conceiving the structure of a magnetic separator according to the present disclosure are described below.

In the case of separating, from a powdery and/or granular material in which ferromagnetic particles and non-magnetic particles are mixed, the ferromagnetic particles using moving magnets, the movement of each particle is observed as follows. First, the ferromagnetic particles are attracted to and move toward the magnets. With a change in magnetic field strength associated with the movement of the magnets, the attractive force acting on the ferromagnetic particles changes. When the magnetic field is strong, the ferromagnetic particles tend to gather together by the attractive force. When the magnetic field is weak, the ferromagnetic particles tend to disperse.

Such a change in attractive force has an effect similar to vibration on the powdery and/or granular material. As the strength of the magnetic field changes repeatedly, the state in which the ferromagnetic particles sandwich and embrace the non-magnetic particles is resolved. This facilitates the separation between the ferromagnetic particles and the non-magnetic particles. Moreover, due to a change in the direction of the magnetic field, a rotational force also acts on the ferromagnetic particles, so that the ferromagnetic particles move toward the magnets while rotating between the non-magnetic particles. By these two effects, a large number of ferromagnetic particles gradually gather near the magnets, whereas the non-magnetic particles move farther from the magnets. By using the changes in the magnitude and direction of the magnetic field in this way, the ferromagnetic particles and the non-magnetic particles can be separated from each other.

(A) to (D) in FIG. 3 schematically illustrate the above-mentioned action. In (A) to (D) in FIG. 3, the magnetic poles of the magnets in the part facing the powdery and/or granular material are represented as "north (N) pole" and "south (S) pole". When the magnets move from the state where the ferromagnetic particles on the conveyor belt b are attracted to a north pole as illustrated in (A) in FIG. 3 to the state where a gap portion k between north and south poles faces the powdery and/or granular material as illustrated in (B) in FIG. 3, the magnitude of the attractive force acting on the ferromagnetic particles changes due to a change in the magnitude of the magnetic field. Moreover, since the magnetic pole changes from a north pole to a south pole, the ferromagnetic particles are attracted in the arrow direction, and move toward the magnets while rolling. After this, the ferromagnetic particles are attracted to a south pole and further move toward the magnets, as illustrated in (C) in FIG. 3. As a result of repeating this action, the ferromagnetic particles which have initially been distributed throughout the powdery and/or granular material layer gather in the part of the powdery and/or granular material layer nearest the magnets, as illustrated in (D) in FIG. 3.

This phenomenon inevitably occurs as long as at least one of the powdery and/or granular material a and the magnets is moving. In other words, the same phenomenon occurs in the case where only the powdery and/or granular material a is moving while the magnets are stationary.

In the case where magnets of the same magnetic pole are arranged side by side and moving, the ferromagnetic particles move due to a change in the magnitude of the magnetic field, but no force deriving from a change in the direction of the magnetic field acts on the ferromagnetic particles, and so the movement of the ferromagnetic particles is smaller. This causes lower separation efficiency.

Although (A) to (D) in FIG. 3 illustrate the case where the magnets move from right to left in the drawing, the same principle applies even in the case where the magnets move from left to right in the drawing.

We discovered that efficient magnetic separation of ferromagnetic particles is achieved by applying this mechanism to the magnetic separator of belt conveyor type in the following manner: Magnets are arranged inside the guide roll on the conveyor end portion side so that magnetic poles adjacent in the circumferential direction of the guide roll in the part facing the powdery and/or granular material are different and magnetic poles adjacent in the axial direction of the guide roll in the part facing the powdery and/or granular material are the same, and the powdery and/or granular material moves in the magnetic field formed by these magnets. We also discovered that this effect is further enhanced by rotating the magnets in the circumferential direction so that the magnitude and direction of the magnetic field acting on the ferromagnetic particles change fast.

We further conducted close study on the problem of the adhesion of ferromagnetic particles that enter between the guide roll and the belt. We consequently found out that ferromagnetic particles $a_1$ causing such a problem mainly fly from the feeder 108 and the conveyor belt 101, and reach the roll circular arc portion of the guide roll 103 not in contact with the conveyor belt 101 from the space on the widthwise end side of the conveyor belt 101, as illustrated in FIG. 4. We thus discovered that blocking the path to reach the roll circular arc portion is effective in resolving the problem of ferromagnetic particles adhering to the roll.

The present disclosure is based on these discoveries.

One aspect of the present disclosure provides a magnetic separator comprising: at least one pair of guide rolls; and a conveyor belt that extends between the pair of guide rolls, and conveys a powdery and/or granular material containing ferromagnetic particles, wherein one guide roll of the pair of guide rolls is a hollow roll, and includes, in a hollow part thereof, a magnet roll including a plurality of magnets that are arranged along an inner peripheral surface of the guide roll in lines at intervals so that different magnetic poles alternate in a circumferential direction, and the magnetic separator further comprises a shield wall that covers a circular arc region of an outer peripheral surface of the guide roll except a circular arc region around which the conveyor belt is wound, to block magnetic lines of force from the plurality of magnets.

The magnetic separator may further comprises an other conveyor belt that is located below the conveyor belt, and conveys the powdery and/or granular material containing the ferromagnetic particles, wherein a part of the conveyor belt corresponding to the magnet roll is located near a powdery and/or granular material conveyance downstream side of the other conveyor belt.

The magnetic separator may further comprise at least one conduit that passes through the shield wall from a back surface thereof to a side facing the guide roll, and supplies air to a clearance between the shield wall and the guide roll.

The magnet roll may be rotatable independently of the guide roll.

A magnetic field change frequency F defined by the following expression (1) and indicating the number of changes of magnetic poles acting on the powdery and/or granular material from the plurality of magnets may be 30 Hz or more:

$$F=(x \cdot P)/60 \quad (1)$$

where x is the number of rotations of the magnet roll expressed in rpm, and P is the number of magnetic poles of the magnet roll, a pair of a north pole and a south pole arranged side by side in the circumferential direction on a surface of the magnet roll facing the powdery and/or granular material being counted as one magnetic pole in the number of magnetic poles.

Magnetic poles of magnets adjacent in an axial direction of the magnet roll from among the plurality of magnets may be the same.

Alternatively, magnetic poles of magnets adjacent in an axial direction of the magnet roll from among the plurality of magnets may be different.

A rotational direction of the one guide roll and a rotational direction of the magnet roll may be the same.

Alternatively, a rotational direction of the one guide roll and a rotational direction of the magnet roll may be opposite.

A rotational direction of the conveyor belt and a rotational direction of the other conveyor belt may be the same.

Alternatively, a rotational direction of the conveyor belt and a rotational direction of the other conveyor belt may be opposite.

The conveyor belt and the one guide roll may be made of a non-metallic material.

Any of the pair of guide rolls may be a non-drive roll.

Another aspect of the disclosure provides a magnetic separation method of separating, from a powdery and/or granular material containing ferromagnetic particles, the ferromagnetic particles using the magnetic separator as described above, the magnetic separation method comprising supplying the powdery and/or granular material onto the conveyor belt, with a thickness that is greater than a diameter of a smallest particle contained in the powdery and/or granular material.

Yet another aspect of the disclosure provides an iron source manufacturing method of manufacturing an iron source from a by-product of a steelmaking process, using the magnetic separator or the magnetic separation method as described above.

Advantageous Effect

It is thus possible to, even in the case where a powdery and/or granular material containing ferromagnetic particles is processed in a large amount or the layer of the supplied powdery and/or granular material is thick, efficiently separate the ferromagnetic particles from the powdery and/or granular material containing the ferromagnetic particles by magnetic separation in one separation process at low cost, without requiring complex processes or liquid waste disposal.

It is also possible to prevent the adhesion of ferromagnetic particles that enter between the guide roll and the conveyor belt, by providing the shield that covers the peripheral surface of the guide roll not in contact with the conveyor belt with a thickness that is beyond the reach of the magnetic force.

DETAILED DESCRIPTION

Figure 1:
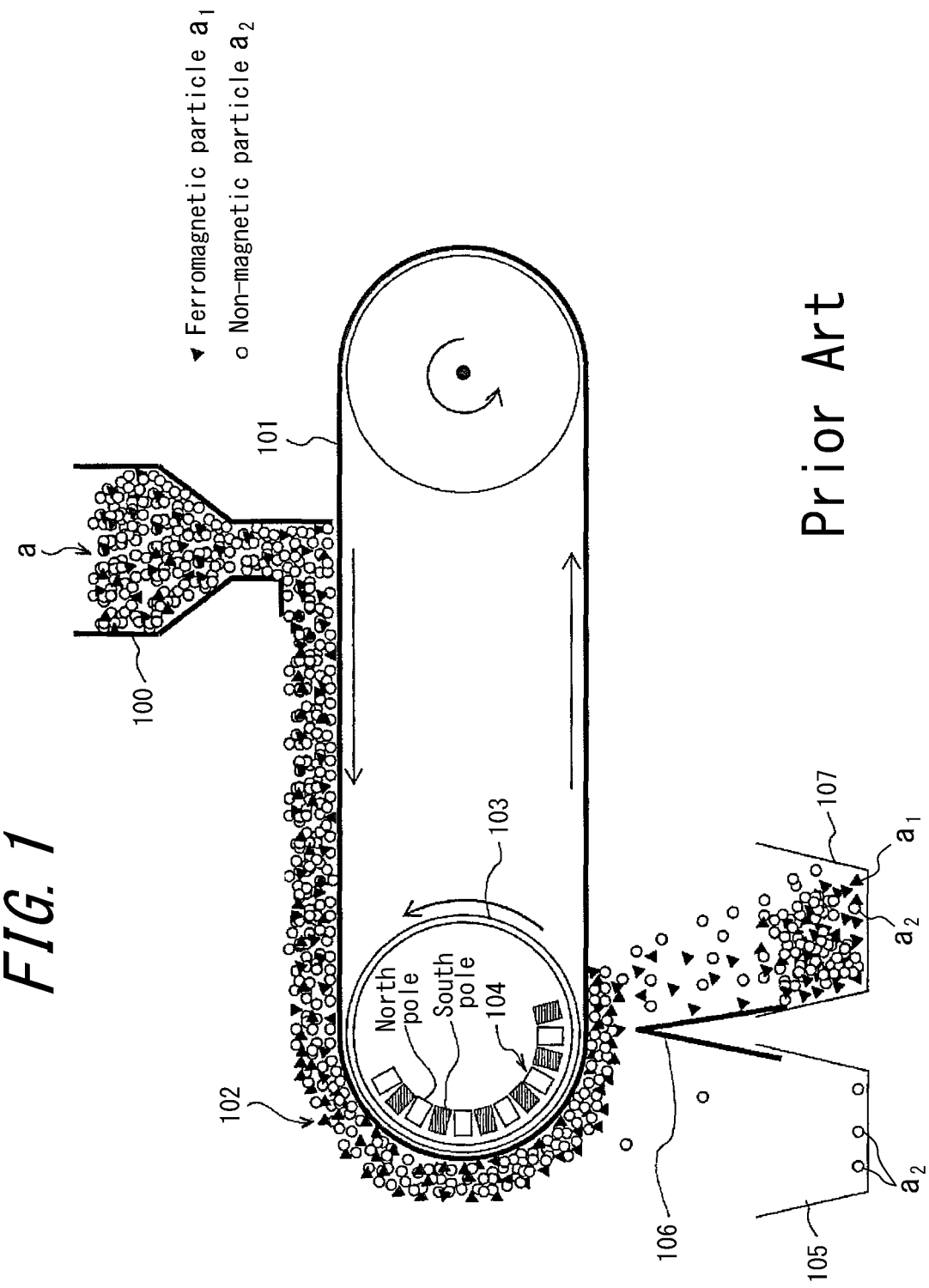
FIG. 1 is an explanatory diagram illustrating a conventional magnetic separator and a use state in the case of processing a powdery and/or granular material in a small amount using the device.

A magnetic separator and a magnetic separation method according to the present disclosure separate, from a powdery and/or granular material containing ferromagnetic particles, the ferromagnetic particles by a magnetic force.

A magnetic separator according to the present disclosure includes: at least one pair of guide rolls; and a conveyor belt that extends between the pair of guide rolls, and conveys a powdery and/or granular material containing ferromagnetic particles, wherein one guide roll of the pair of guide rolls is a hollow roll, and includes, in its hollow part, a magnet roll including a plurality of magnets that are arranged along the inner peripheral surface of the guide roll in lines at intervals so that different magnetic poles alternate in the circumferential direction, and the magnetic separator further includes a shield wall that covers a circular arc region of the outer peripheral surface of the guide roll except a circular arc region around which the conveyor belt is wound, to block magnetic lines of force from the magnets. The magnet roll forms a uniform magnetic field, and so a uniform force acts on the ferromagnetic particles, with it being possible to enhance the ferromagnetic particle separation efficiency. Moreover, the shield wall can prevent the adhesion of ferromagnetic particles that enter between the guide roll and the conveyor belt.

A magnetic separation method according to the present disclosure separates, from a powdery and/or granular material containing ferromagnetic particles, the ferromagnetic particles by a magnetic force using the magnetic separator having the above-mentioned structure.

In the magnetic separator and the magnetic separation method according to the present disclosure, the magnetic field change frequency F (Hz) defined by the following expression (1) and indicating changes in the magnitude of the magnetic field acting on the powdery and/or granular material from the magnet roll is set to 30 Hz or more:

$$F=(x \cdot P)/60 \quad (1)$$

where x is the number of rotations (rpm) of the magnet roll, and P is the number of magnetic poles of the magnet roll (a pair of a north pole and a south pole arranged side by side in the circumferential direction on the surface of the magnet roll facing the powdery and/or granular material being counted as one magnetic pole in the number of magnetic poles).

The magnetic field change frequency F is preferably 50 Hz or more and 160 Hz or less, and more preferably 50 Hz or more and 100 Hz or less.

For example, in the case where a north pole (a), a south pole (b), and a north pole (c) are arranged side by side in the circumferential direction, the pair of the north pole (a) and the south pole (b) is counted as one magnetic pole, and the pair of the south pole (b) and the north pole (c) is counted as one magnetic pole.

Setting the magnetic field change frequency F (Hz) to 30 Hz or more enables the magnitude and direction of the magnetic field acting on the powdery and/or granular material to change fast, with it being possible to accurately separate the ferromagnetic particles contained in the powdery and/or granular material.

Embodiments of the present disclosure are described in detail below.

Embodiment 1

Figure 5:
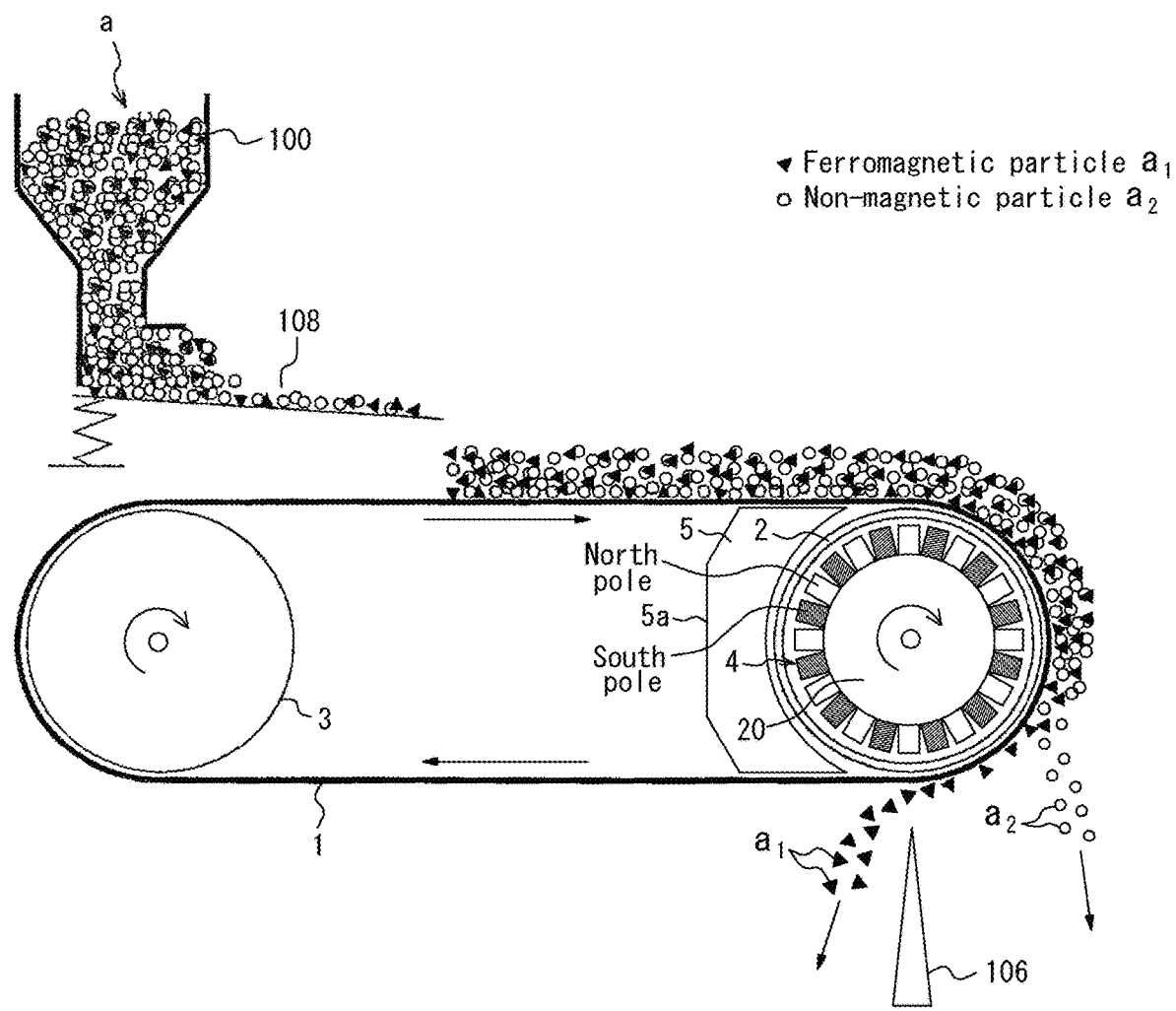
FIG. 5 is an explanatory diagram illustrating a magnetic separator according to Embodiment 1 of the present disclosure.

FIG. 5 is an explanatory diagram illustrating a magnetic separator according to Embodiment 1 of the present disclosure. In the drawing, reference sign 1 is a conveyor belt that conveys a powdery and/or granular material a. The conveyor belt 1 extends between a pair of guide rolls 2 and 3, and rotates under guidance of the guide rolls 2 and 3 to convey the powdery and/or granular material a in one direction. One of the guide rolls 2 and 3, i.e. the guide roll 2 on the end side of the conveyor belt 1 in the conveyance direction of the powdery and/or granular material a, is a hollow roll, and includes, in its hollow part, a rotatable magnet roll 20 including a plurality of magnets 4 that are arranged along the inner peripheral surface of the guide roll in lines at intervals so that different magnetic poles alternate in the circumferential direction.

Figure 2:
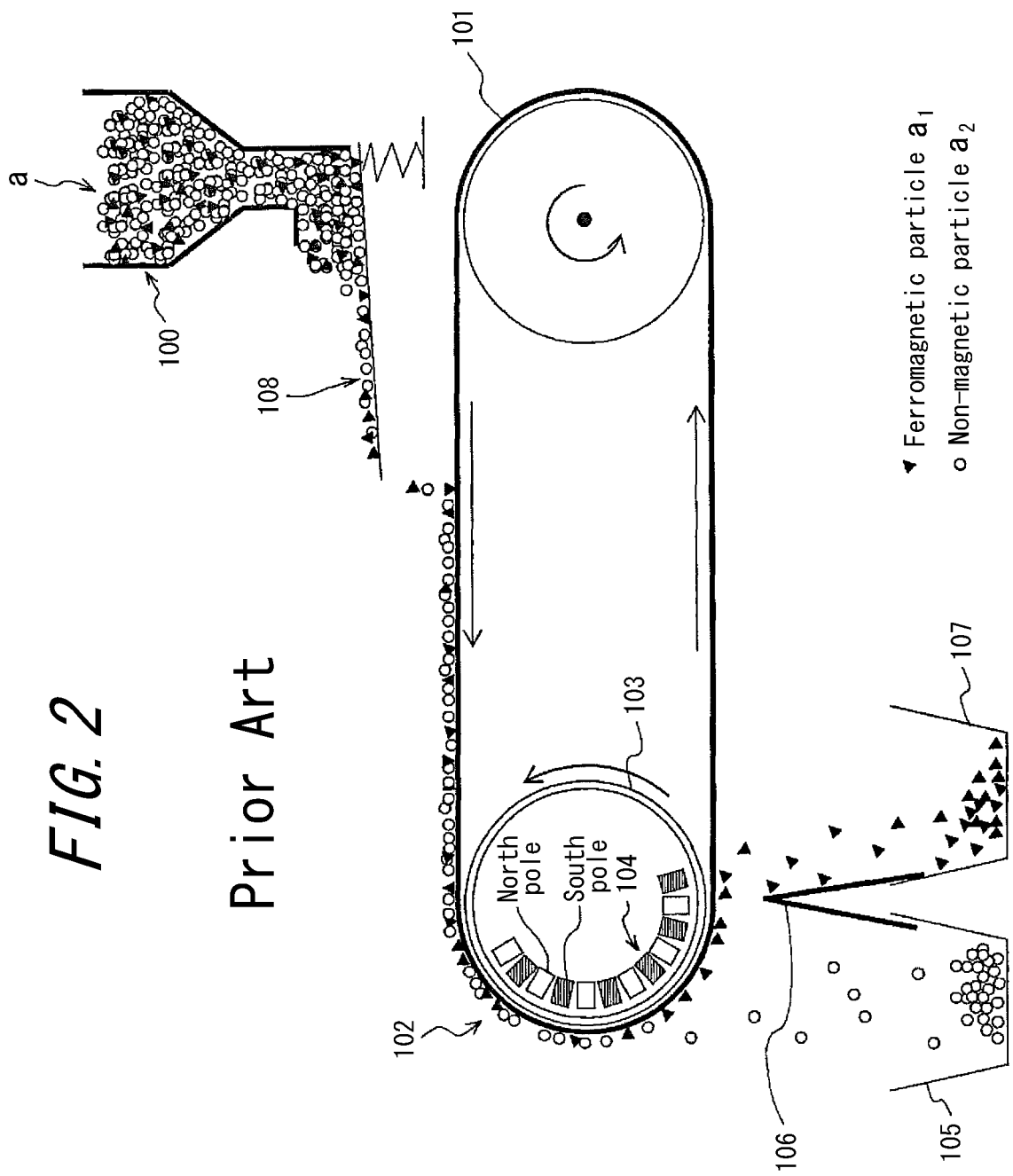
FIG. 2 is an explanatory diagram illustrating a conventional magnetic separator and a use state in the case of processing a powdery and/or granular material in a large amount using the device.
Figure 6:
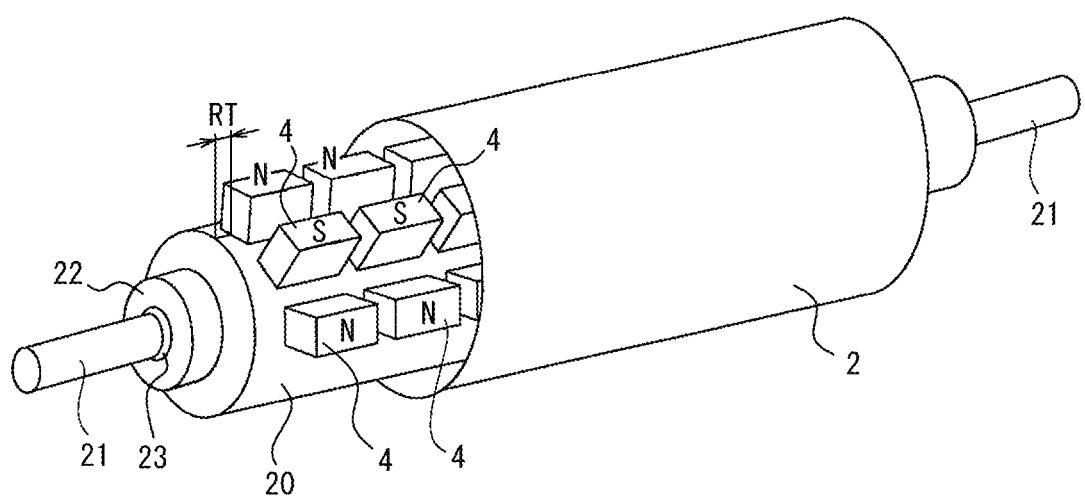
FIG. 6 is a perspective diagram illustrating the structure of a magnet roll according to the present disclosure.

As illustrated in FIG. 6, the magnet roll 20 is located inside the hollow guide roll 2 coaxially with the guide roll 2, and is rotatable independently of the guide roll 2. The magnet roll 20 is formed by fixing, on its peripheral surface, the magnets 4 such as permanent magnets so that different magnetic poles alternate in the circumferential direction. The magnet roll 20 having such a structure can exert the action illustrated in FIG. 2 on the powdery and/or granular material a, thus ensuring the separation of the ferromagnetic particles.

In FIG. 6 illustrating the structure of the magnet roll 20, reference sign 21 is a rotational shaft of the guide roll 2. A rotational shaft 22 of the magnet roll 20 at both ends is provided outside the rotational shaft 21, and attached to the rotational shaft 21 through a bearing 23 (e.g. metal bearing and ball bearing). Here, the guide roll 2 and the magnet roll 20 are rotatable independently of each other. The roll shafts 21 and 22 may take any of various forms.

The magnet roll 20 is a roll that rotates by means such as a motor. The rotational direction of the magnet roll 20 may be the same as or opposite to the rotational direction of the guide roll 2, but is preferably opposite to the rotational direction of the guide roll 2. The magnet roll 20 is preferably rotated faster than the guide roll 2.

The rotational direction of the magnet roll 20 may be any of (i) the direction opposite to the direction of movement of the conveyor belt 1 (the rotational direction of the guide roll 2) and (ii) the same direction as the direction of movement of the conveyor belt 1 (the rotational direction of the guide roll 2). The ferromagnetic particles are subjected to a carrying force of moving them in the direction opposite to the rotational direction of the magnet roll 20 by the action of the magnetic field of the rotating magnet roll 20. In the case of (i), the carrying force on the ferromagnetic particles by the magnetic field and the frictional force between the conveyor belt 1 and the ferromagnetic particles are in the same direction. In the case of (ii), the carrying force and the frictional force are in opposite directions. In this case, the ferromagnetic particles are carried in the direction of movement of the conveyor belt 1 because the frictional force is greater.

Comparison between (i) and (ii) reveals the following. In the case of (ii), the carrying force on the ferromagnetic particles by the magnetic field and the frictional force between the conveyor belt 1 and the ferromagnetic particles are in opposite directions. Hence, while the ferromagnetic particles may sometimes stay on the conveyor belt 1, the ferromagnetic particles can be separated more efficiently. In the case of (i), the ferromagnetic particle separation efficiency is slightly lower than that of (ii), but there is the advantage of smoothly carrying the ferromagnetic particles without the ferromagnetic particles staying on the conveyor belt 1.

In FIG. 6, the different magnetic poles of one magnet 4 are located on the inner side and the outer side in the radial direction of the magnet roll 20. Alternatively, the different magnetic poles of one magnet 4 may be located side by side in the circumferential direction of the magnet roll 20. In this case, too, a north pole and a south pole alternate, so that the ferromagnetic particles are separated efficiently. A north pole and a south pole may be arranged with an inter-magnet gap portion therebetween. Alternatively, north poles may be arranged with a gap portion therebetween, and south poles may be arranged with a gap portion therebetween. The width of the gap portion between magnets 4 adjacent in the roll circumferential direction is not limited, but an appropriate width to achieve the above-mentioned effect is about 1 mm to 50 mm. The gap portion between the magnets 4 may be filled with resin or the like.

The size of each magnet 4 is not limited, and may be any size that allows a predetermined number of magnets 4 to be provided. The magnets 4 of the magnet roll 20 may be covered with a cover.

Figure 7:
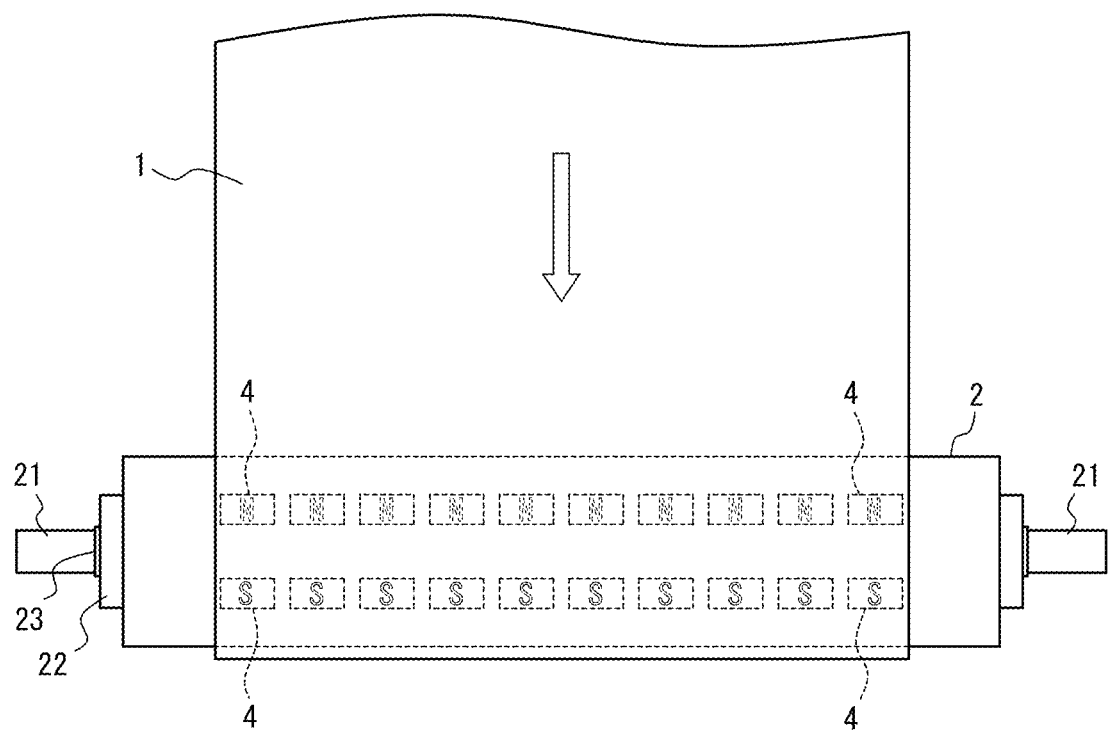
FIG. 7 is a diagram illustrating the relationship between the magnet array length and the conveyor belt width.

The array of the magnets 4 in the roll axial direction is preferably within the width of the conveyor belt 1, as illustrated in FIG. 7. This can keep the ferromagnetic particles from adhering to the part of the roll 2 not in contact with the conveyor belt 1.

Figure 4:
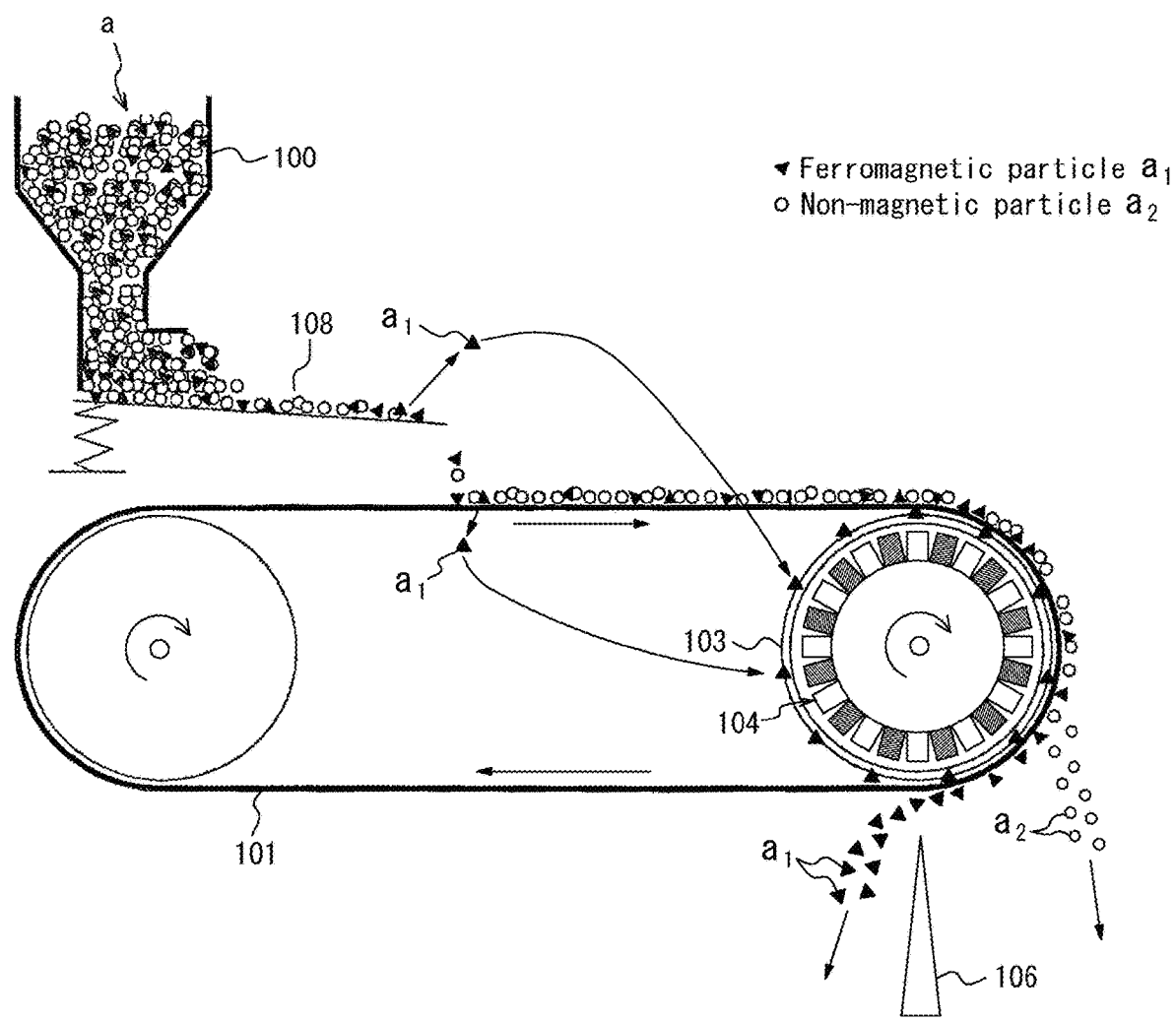
FIG. 4 is an explanatory diagram illustrating how ferromagnetic particles adhere to a magnet roll.

The magnetic separator further includes a shield wall 5 that covers the circular arc region of the outer peripheral surface of the guide roll 2 except the circular arc region around which the conveyor belt 1 is wound, and extends across the full width of the guide roll 2 in the axial direction of the guide roll 2. It is important that the shield wall 5 has a function of blocking magnetic lines of force from the magnets 4 of the magnet roll 20. In the example illustrated in FIG. 5, the back surface 5a of the shield wall 5 needs to be away from the peripheral surface of the magnet roll 20 at such a distance that is beyond the influence of the magnetic lines of force, and the shield wall 5 has a thickness that satisfies this need. The shield wall 5 having such a structure ensures that the adhesion of flying ferromagnetic particles to the magnet roll 20 described with reference to FIG. 4 is prevented.

Regarding the thickness of the shield wall 5, i.e. the distance that is beyond the influence of the magnetic lines of force, the back surface 5a is preferably at a distance of 30 mm or more and more preferably at a distance of 50 mm or more from the guide roll surface, to sufficiently reduce the influence of the magnetic lines of force and block the magnetic lines of force. No upper limit on the thickness of the shield wall 5 is placed, yet the thickness of the shield wall 5 is preferably 200 mm or less because a thickness of more than 200 mm imposes equipment constraints.

The length of the shield wall 5 along the axial direction of the guide roll 2 is preferably the full width of the guide roll 2 as mentioned above, but the shield wall 5 functions sufficiently if the edge of the shield wall 5 is in the the region RT depicted in FIG. 6, i.e. the region from the edge of the guide roll 2 to the beginning of the array of the magnets 4.

A magnetic separation method using this device is described below, together with the functions and actions of the magnetic separator illustrated in FIG. 5.

When performing magnetic separation using this magnetic separator, the feed speed of the conveyor belt 1 is set to a speed required for the process. The rotational speed of the magnet roll 20 is determined so that the change of the magnetic field is sufficiently fast with respect to the belt feed speed. In particular, the rotational speed of the magnet roll 20 is preferably set so as to satisfy the condition in the foregoing expression (1).

In the state where the conveyor belt is rotating, the powdery and/or granular material a containing the ferromagnetic particles is supplied, with a sufficient thickness, from the supply device 100 onto the moving conveyor belt 1, and conveyed to the guide roll 2 side of the conveyor belt 1.

The powdery and/or granular material a conveyed by the conveyor belt 1 is exposed to the magnetic field of the magnet roll 20, upon reaching the region where the conveyor belt 1 is in contact with the guide roll 2.

Figure 3:
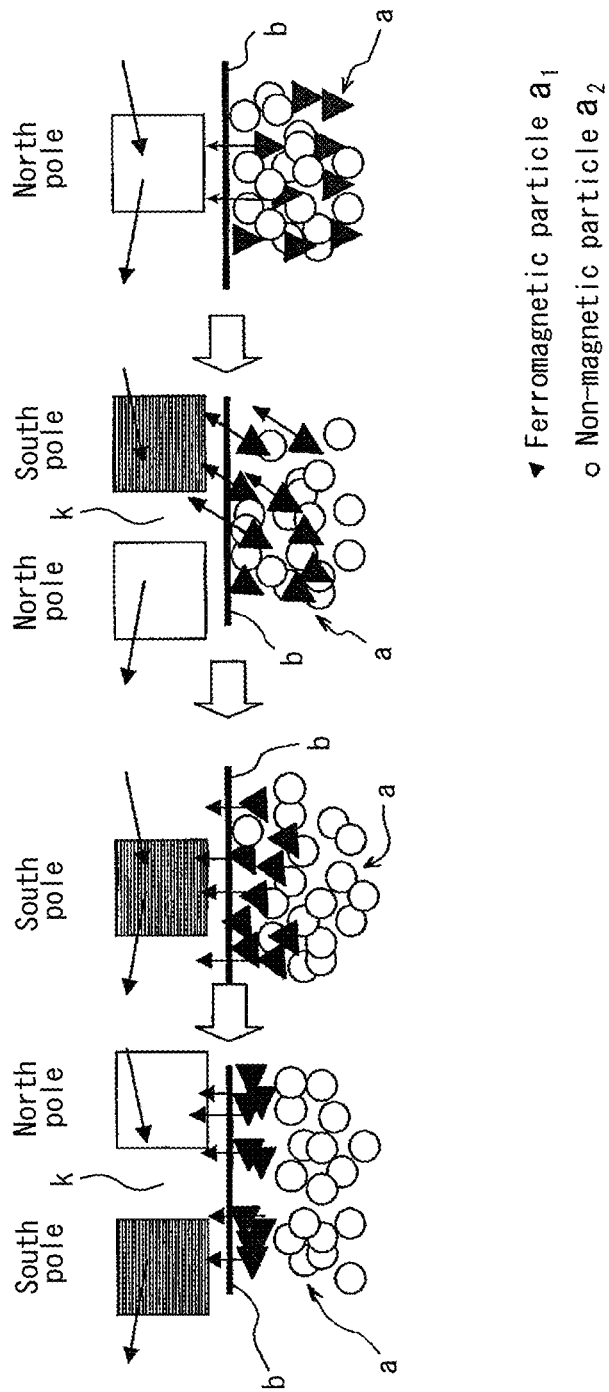
FIGS. 3A, 3B, 3C, and 3D are explanatory diagrams schematically illustrating the action of a magnetic separator according to the present disclosure.

In the magnetic separator illustrated in FIG. 5, in a process in which the powdery and/or granular material a in a form that the ferromagnetic particles embrace the non-magnetic particles is carried while adhering to the conveyor belt 1 by the magnetic force of the magnet roll 20, the ferromagnetic particles $a_1$ in the powdery and/or granular material a are subjected to the action of the magnetic field of the magnets 4 in the magnet roll 20. Here, with the rotation of the magnet roll 20, the strength of the magnetic field instantly changes as strong→weak→strong→weak→ . . . . The effect on the ferromagnetic particles in the powdery and/or granular material layer alternates as gather→disperse→gather→disperse→ . . . , as illustrated in FIG. 3. Hence, while the adhesion of the ferromagnetic particles is maintained, the non-magnetic particles separate from the conveyor belt 1 and fall by gravitation.

In particular, with the structure in the embodiment illustrated in FIGS. 5 and 6 in which the magnet roll 20 having the magnets 4 fixed thereto is located inside the guide roll 2 and rotated independently of the guide roll 2, the following actions are exerted: (1) Rotating the magnet roll 20 produces fast magnetic field change mechanically; (2) The powdery and/or granular material a is supplied into the changing magnetic field, with a sufficient layer thickness; (3) While resolving the enfoldment and embracement of the non-magnetic particles by the ferromagnetic particles by the magnetic field change, the ferromagnetic particles move toward the magnets 4, and the non-magnetic particles move farther from the magnets 4 to be removed; and (4) The non-magnetic particles fall by gravitation at the turning portion of the conveyor belt 1, and the ferromagnetic particles are carried while being attracted to and held by the conveyor belt 1, and separate from the conveyor belt 1 at the position beyond the reach of the magnetic force and are discharged. By these actions, the ferromagnetic particles can be magnetically separated efficiently even when the powdery and/or granular material a supplied to the conveyor belt 1 has a sufficient thickness, as illustrated in FIG. 5. Thus, the ferromagnetic particles $a_1$ can be magnetically separated from the powdery and/or granular material a efficiently and speedily.

By rotating the magnet roll 20 in the magnet roll structure illustrated in FIG. 6, for example, the strength and direction of the magnetic field can be easily changed 100 or more times while conveying the powdery and/or granular material a. Here, since the behavior of the ferromagnetic particles in the magnetic field varies depending on the powdery and/or granular material a to be processed, it is preferable to adjust the number of rotations of the magnet roll 20 so as to achieve appropriate performance.

In Embodiment 1, the magnetic field is desirably changed as fast as possible (fast changes in the strength and direction of the magnetic field). As mentioned above, the magnetic field change frequency F (Hz) of the magnet roll 20 defined by the following expression (1) is preferably 30 Hz or more:

$$F=(x \cdot P)/60 \quad (1)$$

where x is the number of rotations (rpm) of the magnet roll, and P is the number of magnetic poles of the magnet roll (a pair of a north pole and a south pole arranged side by side in the circumferential direction on the surface of the magnet roll facing the powdery and/or granular material being counted as one magnetic pole in the number of magnetic poles).

The magnetic field change frequency is more preferably 50 Hz or more and 160 Hz or less.

For example, in the case where a north pole (a), a south pole (b), and a north pole (c) are arranged side by side in the circumferential direction, the pair of the north pole (a) and the south pole (b) is counted as one magnetic pole, and the pair of the south pole (b) and the north pole (c) is counted as one magnetic pole. Suppose magnets (e.g. neodymium magnets) of 12 poles (a pair of a north pole and a south pole being counted as one magnetic pole) are arranged in the circumferential direction. Then, a magnetic field change frequency of 30 Hz is realized if the rotational speed of the magnet roll 20 is 150 rpm. Suppose magnets of 24 poles (a pair of a north pole and a south pole being counted as one magnetic pole) are arranged in the circumferential direction. Then, a magnetic field change frequency of 30 Hz is realized if the rotational speed of the magnet roll 20 is 75 rpm.

The upper limit of the magnetic field change frequency is about 160 Hz, given that the number of rotations of the magnet roll 20 has a mechanical upper limit and the effect of the magnetic field change may be saturated even when the frequency is increased.

The magnetic separator according to Embodiment 1 can magnetically separate the ferromagnetic particles from the powdery and/or granular material a efficiently, as described above. Accordingly, in the magnetic separation of the powdery and/or granular material a using the device, the powdery and/or granular material a is desirably supplied from the supply device 100 onto the conveyor belt 1 with a layer thickness that is greater than the diameter of the smallest particle contained in the powdery and/or granular material a and for which the magnetic force acts sufficiently, as illustrated in FIG. 5. In detail, the thickness of the powdery and/or granular material is 20 mm to 30 mm.

The powdery and/or granular material subjected to magnetic separation is not limited. Examples of the powdery and/or granular material include slag such as steelmaking slag, and tailing ores. The magnetic separator is particularly suitable for the magnetic separation of slag.

In iron recovery from slag, steelmaking slag is first atomized. If the atomization is insufficient, the iron recovery rate is low. Since there are various ironmaking or steelmaking processes in which steelmaking slag is produced, various slags are produced. The slag particle size after the atomization is determined depending on the slag. The slag often needs to be atomized to about several 10 μm to 1 mm, depending on the form of iron contained. A typical atomization method is grinding. After grinding the slag using a jaw crusher or a hammer crusher as rough grinding, the slag is further ground for pulverization using a ball mill, a rod mill, a jet mill, a pin mill, an impact mill, or the like. Another method is to heat the slag to about 1000° C. to 1300° C. and then gradually cool the slag.

The atomized slag is then subjected to magnetic separation by the magnetic separator according to the present disclosure. According to the present disclosure, iron can be efficiently separated and recovered from the slag.

In Embodiment 1 illustrated in FIG. 5, the magnets 4 are arranged so that the magnetic poles in the part facing the powdery and/or granular material a are the same in the axial direction of the magnet roll 20, as illustrated in FIG. 6. In the case where the same magnetic pole is provided in the width direction, a uniform magnetic field is formed, and a uniform force acts on the ferromagnetic particles.

Figure 8:
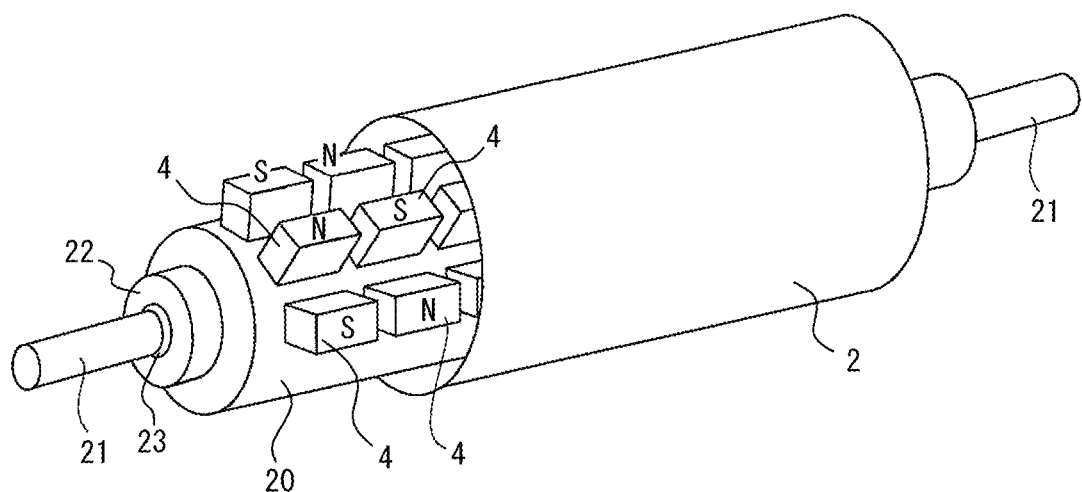
FIG. 8 is a perspective diagram illustrating the structure of another magnet roll according to the present disclosure.

In the case where the magnets 4 are arranged so that the magnetic poles are different in the axial direction of the magnet roll 20 as illustrated in FIG. 8, on the other hand, the direction of the magnetic field change becomes complex, so that a sufficient magnetic separation effect can be achieved even when the magnet roll rotates at low speed.

Members around the rotating magnet roll are affected by the eddy current effect due to the changing magnetic field, and metal members, even when they are non-magnetic, are heated by the eddy current. Therefore, the conveyor belt 1, the guide roll 2, and the shield wall 5 in this embodiment are preferably made of a non-metallic material such as resin or ceramic.

Embodiment 2

Figure 9:
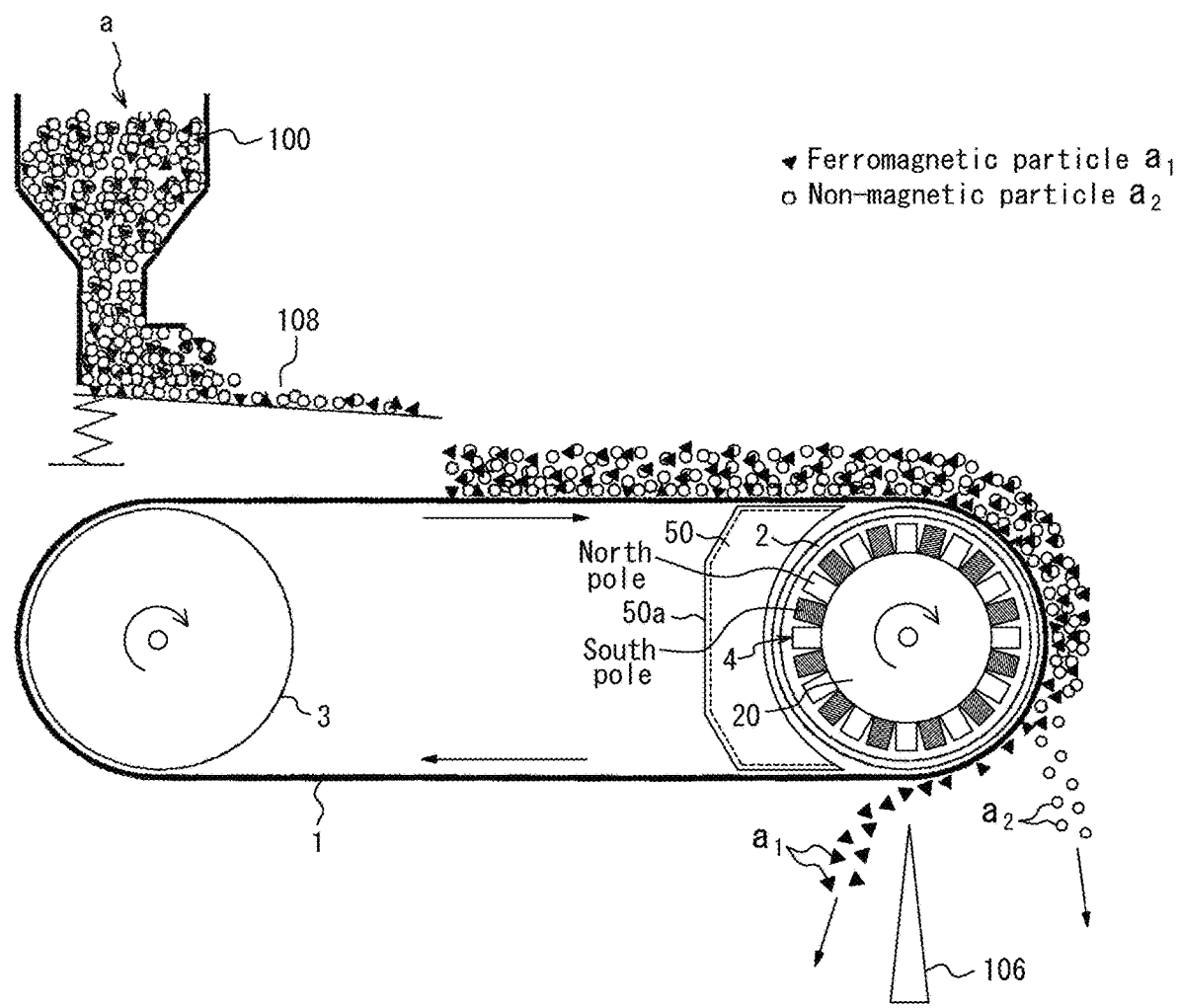
FIG. 9 is an explanatory diagram illustrating a magnetic separator according to Embodiment 2 of the present disclosure.

Instead of the shield wall 5 having a thick wall structure in Embodiment 1 illustrated in FIG. 5, a shield wall 50 having a cover structure that is concave inside may be provided, as illustrated in FIG. 9. By forming the shield wall 50 as a cover structure, the back surface 50a of the shield wall 50 can be separated from the peripheral surface of the magnet roll 20 at such a distance that is beyond the influence of the magnetic field, with a space therebetween. The separation distance is approximately the same as the thickness of the shield wall 5 mentioned above.

Embodiment 3

Figure 10:
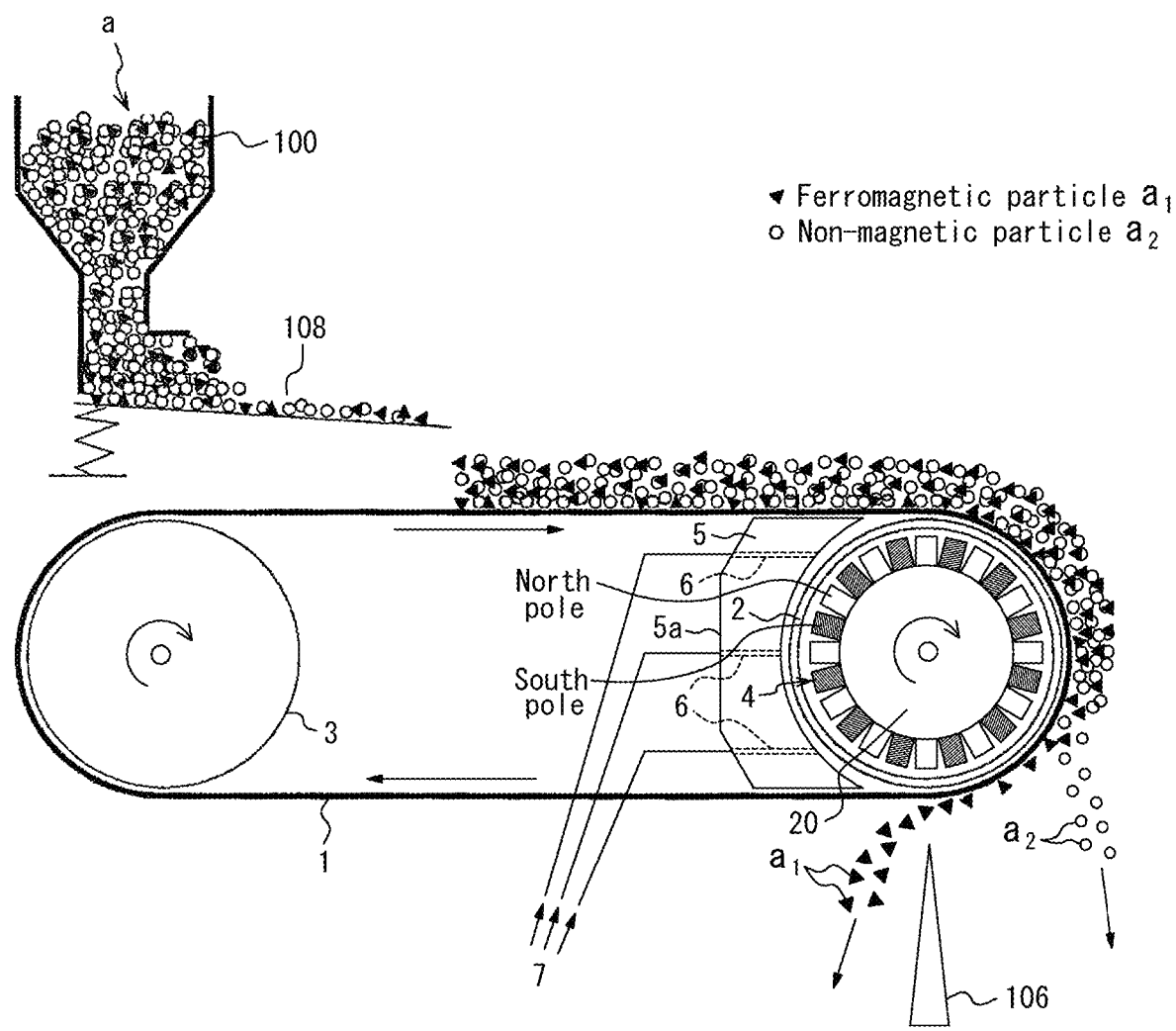
FIG. 10 is an explanatory diagram illustrating a magnetic separator according to Embodiment 3 of the present disclosure.

As illustrated in FIG. 10, at least one conduit 6 (three conduits 6 in the drawing) that passes through the shield wall 5 from its back surface to the guide roll 2 side is provided in the structure of Embodiment 1 illustrated in FIG. 5. By supplying air 7 to these conduits 6, the air is jetted from the clearance between the shield wall 5 and the guide roll 2. This prevents flying ferromagnetic particles from entering into such fine clearance. Here, if the clearance between the shield wall 5 and the guide roll 2 is about 0.5 mm to 10 mm, the entrance of the ferromagnetic particles can be effectively suppressed by the air jet.

Embodiment 4

Figure 11:
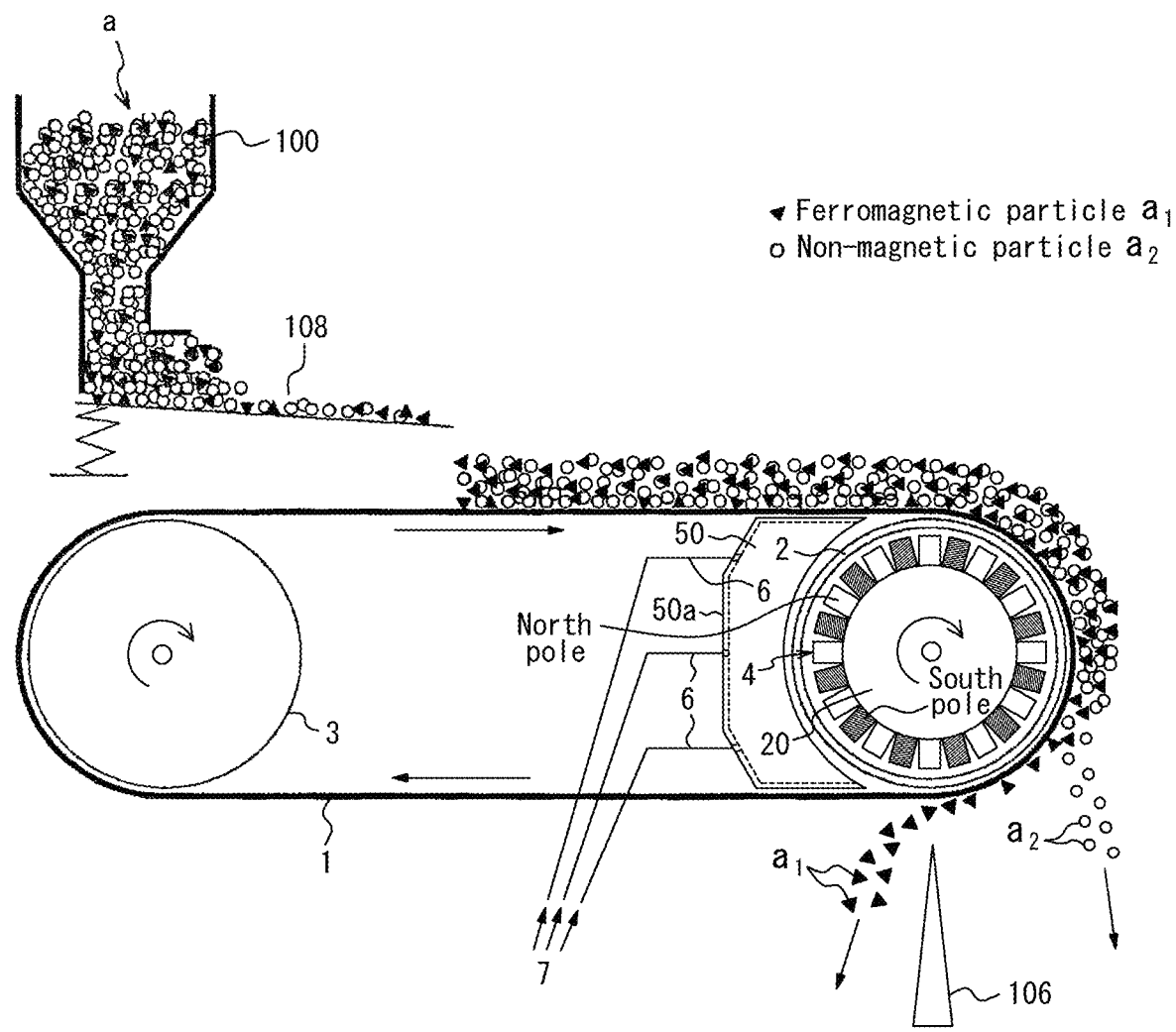
FIG. 11 is an explanatory diagram illustrating a magnetic separator according to Embodiment 4 of the present disclosure.

Embodiment 3 may also be applied to Embodiment 2 illustrated in FIG. 9, as illustrated in FIG. 11. In Embodiment 4, air filling the inside of the shield wall 50 leaks out of the clearance between the side edge of the shield wall 50 and the guide roll 2, so that the air jetting from the clearance can be made uniform in flow rate. The clearance is preferably about 0.5 mm to 10 mm, as in Embodiment 3.

Embodiment 5

Figure 12:
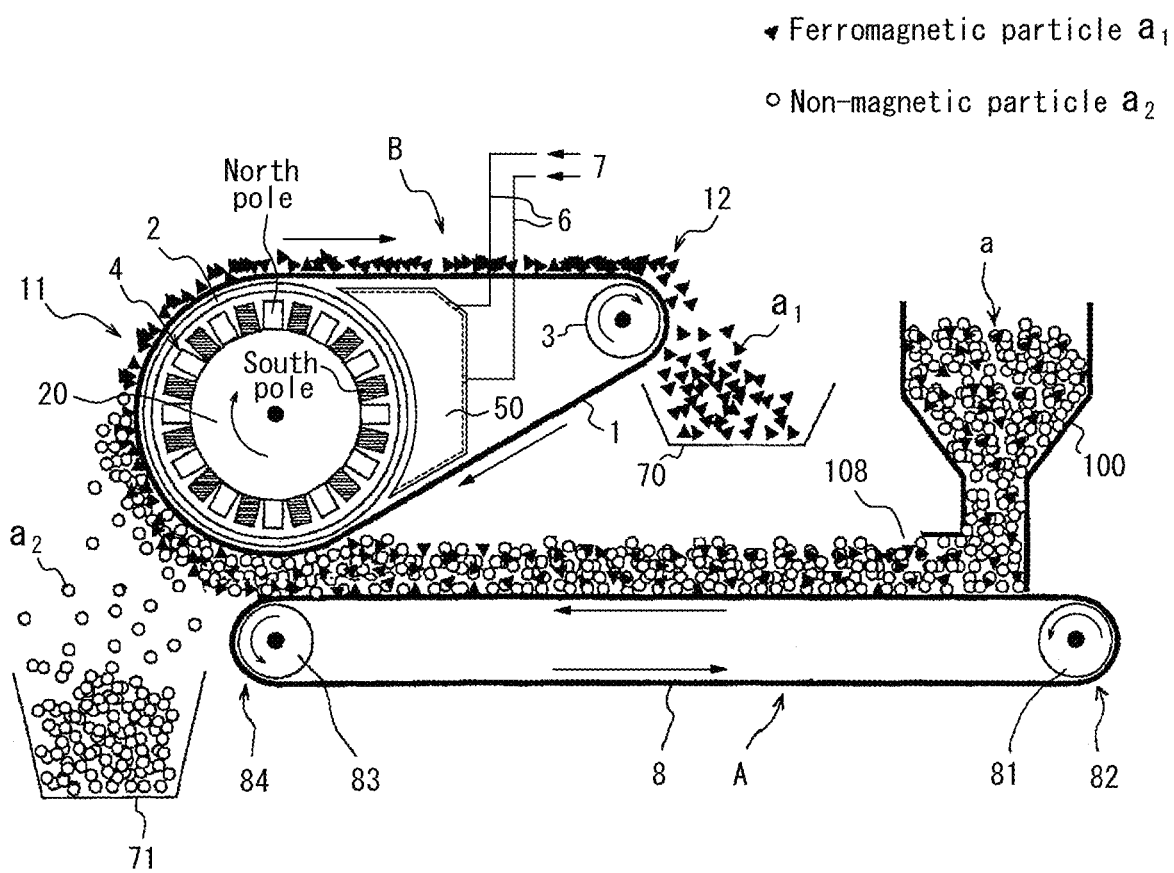
FIG. 12 is an explanatory diagram illustrating a magnetic separator according to Embodiment 5 of the present disclosure.

A device according to Embodiment 5 illustrated in FIG. 12 includes: a first belt conveyor A that conveys the powdery and/or granular material a; and a second belt conveyor B that is located above the first belt conveyor A, and attracts and separates the ferromagnetic particles by a magnetic force from the powdery and/or granular material a conveyed by the belt conveyor A.

In the first belt conveyor A, reference sign 8 is a conveyor belt different from the conveyor belt 1 in the foregoing Embodiments 1 to 4, 81 is a guide roll on the conveyor start portion 82 side, and 83 is a guide roll on the conveyor end portion 84 side. The belt conveyor A is formed by extending the conveyor belt 8 between the guide rolls 81 and 83.

In the second belt conveyor B, reference sign 1 is a conveyor belt same as the conveyor belt 1 in the foregoing Embodiments 1 to 4, 2 is a guide roll on the conveyor start portion 11 side, and 3 is a guide roll on the conveyor end portion 12 side. The belt conveyor B is formed by extending the conveyor belt 1 between the guide rolls 2 and 3. In Embodiment 5, the guide roll 2 has a larger diameter than the guide roll 3, and the rotational axis of the guide roll 3 is located higher than the rotational axis of the guide roll 2, so that the upper surface of the conveyor belt 1 (the upper belt portion between the guide rolls 2 and 3) is substantially horizontal. Alternatively, the upper surface of the conveyor belt 1 may be tilted downward to the guide roll 3.

The supply device 100 that supplies the powdery and/or granular material a containing the ferromagnetic particles onto the conveyor belt 1 is located near the conveyor start portion 82 of the belt conveyor A.

The ferromagnetic particles attracted to and held by the belt conveyor B are, having been conveyed by the belt conveyor B, discharged from the conveyor end portion 12. A magnetically attracted matter recovery portion 70 is provided below the conveyor end portion 12 of the belt conveyor B. Meanwhile, the non-magnetic particles fall below the conveyor start portion 11 of the belt conveyor B, where a non-magnetically attracted matter recovery portion 71 is provided.

In Embodiment 5 illustrated in FIG. 12, the conveyor start portion 11 of the belt conveyor B is located near and above the conveyor end portion 84 of the belt conveyor A. The guide rolls 81 and 83 of the belt conveyor A and the guide rolls 2 and 3 of the belt conveyor B rotate in opposite directions to each other, and the conveyor belts 1 and 8 move in the same direction in the conveyor end portion 84 of the belt conveyor A and the conveyor start portion 11 of the belt conveyor B.

Any of the guide rolls 2 and 3 of the belt conveyor B is driven by drive means such as a motor. Typically, the guide roll 3 is a drive roll, and the guide roll 2 is a non-drive roll.

In Embodiment 5, the magnet roll 20 including the plurality of magnets 4 is provided inside the guide roll 2, as mentioned above. The magnet roll 20 is rotatable independently of the guide roll 2.

The plurality of magnets 4 are arranged at predetermined intervals in the roll circumferential direction and axial direction of the magnet roll 20, as illustrated in FIG. 6. The plurality of magnets 4 are arranged so that adjacent magnetic poles alternate between a north pole and a south pole throughout 360° C. in the roll circumferential direction of the magnet roll 20. The plurality of magnets 4 are also arranged so that the magnetic poles are the same in the axial direction of the magnet roll 20. Alternatively, the magnets 4 may be arranged so that the magnetic poles are different in the axial direction of the magnet roll 20, as illustrated in FIG. 8.

The number of magnets 4 arranged in the roll circumferential direction, the intervals between the magnets 4, and the like are not limited. When the number of magnets 4 is greater or the intervals between the magnets 4 are smaller, the magnitude and direction of the magnetic field change faster. In other words, fast magnetic field change can be achieved even if the rotational speed of the magnet roll 20 is low.

The strength of the magnetic field by the magnets 4 is not limited. Typically, the magnets 4 are preferably selected so that the strength is about 0.01 T to 0.5 T in the conveyor belt portion in contact with the guide roll 2, depending on the object. If the magnetic field is excessively weak, the effect by the magnet roll 20 is insufficient. If the magnetic field is excessively strong, an excessively strong attractive force acts on the ferromagnetic particles, which can hamper the separation of the ferromagnetic particles.

In the device according to Embodiment 5, by the plurality of magnets 4 arranged at predetermined intervals and the gap portion between adjacent magnets 4, the magnetic field changes as strong→weak→strong→weak→ . . . , and the effect on the ferromagnetic particles in the powdery and/or granular material layer alternates as gather→disperse→gather→disperse→ . . . . The width of the gap portion between magnets 4 adjacent in the roll circumferential direction is not limited, but a width of about 1 mm to 50 mm is appropriate in order to achieve the above-mentioned effect.

The magnetic field applied by the magnet roll 20 is desirably changed as fast as possible (fast changes in the strength and direction of the magnetic field). As mentioned above, the magnetic field change frequency F of the magnet roll 20 defined by the foregoing expression (1) is preferably 30 Hz or more.

A magnetic separation method using this device is described below, together with the functions and actions of the magnetic separator illustrated in FIG. 12.

When performing magnetic separation using this magnetic separator, the feed speed of the conveyor belt 1 is set to a speed required for the process. The rotational speed of the magnet roll 20 is determined so that the change of the magnetic field is sufficiently fast with respect to the belt feed speed. In particular, the rotational speed of the magnet roll 20 is preferably set so as to satisfy the condition in the foregoing expression (1).

In the state where the belt conveyors A and B are in operation, the powdery and/or granular material a containing the ferromagnetic particles is supplied, with a sufficient thickness, from the supply device 100 onto the moving conveyor belt 8 of the belt conveyor A, and conveyed to the conveyor end portion 84. The upper surface of the powdery and/or granular material a conveyed by the conveyor belt 8 comes into contact with the lower surface of the conveyor start portion 11 of the belt conveyor B near the conveyor end portion 84, and the powdery and/or granular material a enters between the conveyor end portion 84 of the belt conveyor A and the conveyor start portion 11 of the belt conveyor B. Here, the powdery and/or granular material a is subjected to the magnetic field of the magnet roll 2 of the belt conveyor B.

In the magnetic separator illustrated in FIG. 12, the powdery and/or granular material a in a form that the ferromagnetic particles embrace the non-magnetic particles is carried by the conveyor belt 1 while adhering to the lower surface of the belt conveyor B by the magnetic force of the magnet roll 20. The ferromagnetic particles in the powdery and/or granular material a are subjected to the action of the magnetic field of the magnets 4 in the magnet roll 20. Here, with the rotation of the magnet roll 20, the strength of the magnetic field instantly changes as strong→weak→strong→weak→ . . . . The effect on the ferromagnetic particles in the powdery and/or granular material layer alternates as gather→disperse→gather→disperse→ . . . .

Since the magnet roll 20 rotates independently of the guide roll 2 as illustrated in FIG. 6, the following actions are exerted: (1) Rotating the magnet roll 20 produces fast magnetic field change mechanically; (2) The powdery and/or granular material a is supplied into the changing magnetic field, with a sufficient layer thickness; (3) While resolving the enfoldment and embracement of the non-magnetic particles by the ferromagnetic particles by the magnetic field change, the ferromagnetic particles move toward the magnet roll 20, and the non-magnetic particles move farther from the magnet roll 20 to be removed; and (4) The non-magnetic particles fall by gravitation at the conveyor start portion 11 of the belt conveyor B, and the ferromagnetic particles are carried while being attracted to and held by the belt conveyor B, and discharged at the conveyor end portion 12 of the belt conveyor B. Accordingly, the ferromagnetic particles can be magnetically separated efficiently even when the powdery and/or granular material a supplied to the conveyor belt 1 has a substantial thickness as illustrated in FIG. 12. Thus, the ferromagnetic particles can be magnetically separated from the powdery and/or granular material a efficiently and speedily.

In the device according to Embodiment 5 illustrated in FIG. 12, the magnet roll 20 rotates independently of the guide roll 2, so that the strength and direction of the magnetic field can be easily changed 100 or more times while conveying the powdery and/or granular material a along the guide roll 2 of the belt conveyor B. Here, since the behavior of the ferromagnetic particles in the magnetic field varies depending on the powdery and/or granular material a to be processed, appropriate performance can be achieved by adjusting the number of rotations of the magnet roll 20.

Even the conventional device illustrated in FIG. 1 has the number of changes of the strength and direction of the magnetic field corresponding to the number of magnets, and so has the effect of separating the ferromagnetic particles in the powdery and/or granular material a. However, since the magnets are stationary, the number of times the magnetic field changes is limited (several times to several tens of times), and the ferromagnetic particle separation effect is low. In the device according to this embodiment, on the other hand, the magnet roll 20 rotates independently of the guide roll 2, so that the magnetic field can be easily changed 100 or more times while conveying the powdery and/or granular material along the conveyor belt 1.

The magnetic separator according to Embodiment 5 can magnetically separate the ferromagnetic particles from the powdery and/or granular material a efficiently, as described above. Accordingly, in the magnetic separation of the powdery and/or granular material a using the device, the powdery and/or granular material a is desirably supplied from the supply device 6 onto the conveyor belt 1 of the belt conveyor A with such a layer thickness that is greater than the diameter of the smallest particle contained in the powdery and/or granular material a and for which the magnetic force acts sufficiently, as illustrated in FIG. 12. In detail, the thickness of the powdery and/or granular material is 20 mm to 30 mm.

The device according to Embodiment 5 subjects the powdery and/or granular material a (powdery and/or granular material layer) conveyed by the belt conveyor A to the action of the magnetic field of the magnets 4 provided inside the guide roll 2 on the conveyor start portion 11 side of the belt conveyor B, and attracts the ferromagnetic particles in the powdery and/or granular material a and moves the ferromagnetic particles toward the lower surface of the belt conveyor B, thus separating the ferromagnetic particles. The interval between the conveyor end portion 84 of the belt conveyor A and the conveyor start portion 11 of the belt conveyor B may be any interval with which the magnetic force of the magnet roll 20 sufficiently acts on the ferromagnetic particles in the powdery and/or granular material a. Typically, the interval is preferably such an interval with which the upper surface of the layer of the powdery and/or granular material a conveyed by the conveyor belt 8 of the belt conveyor A comes into contact with the conveyor start portion 11 of the belt conveyor B, i.e. the powdery and/or granular material layer can enter between the conveyor end portion 84 of the belt conveyor A and the conveyor start portion 11 of the belt conveyor B.

Embodiment 6

Figure 13:
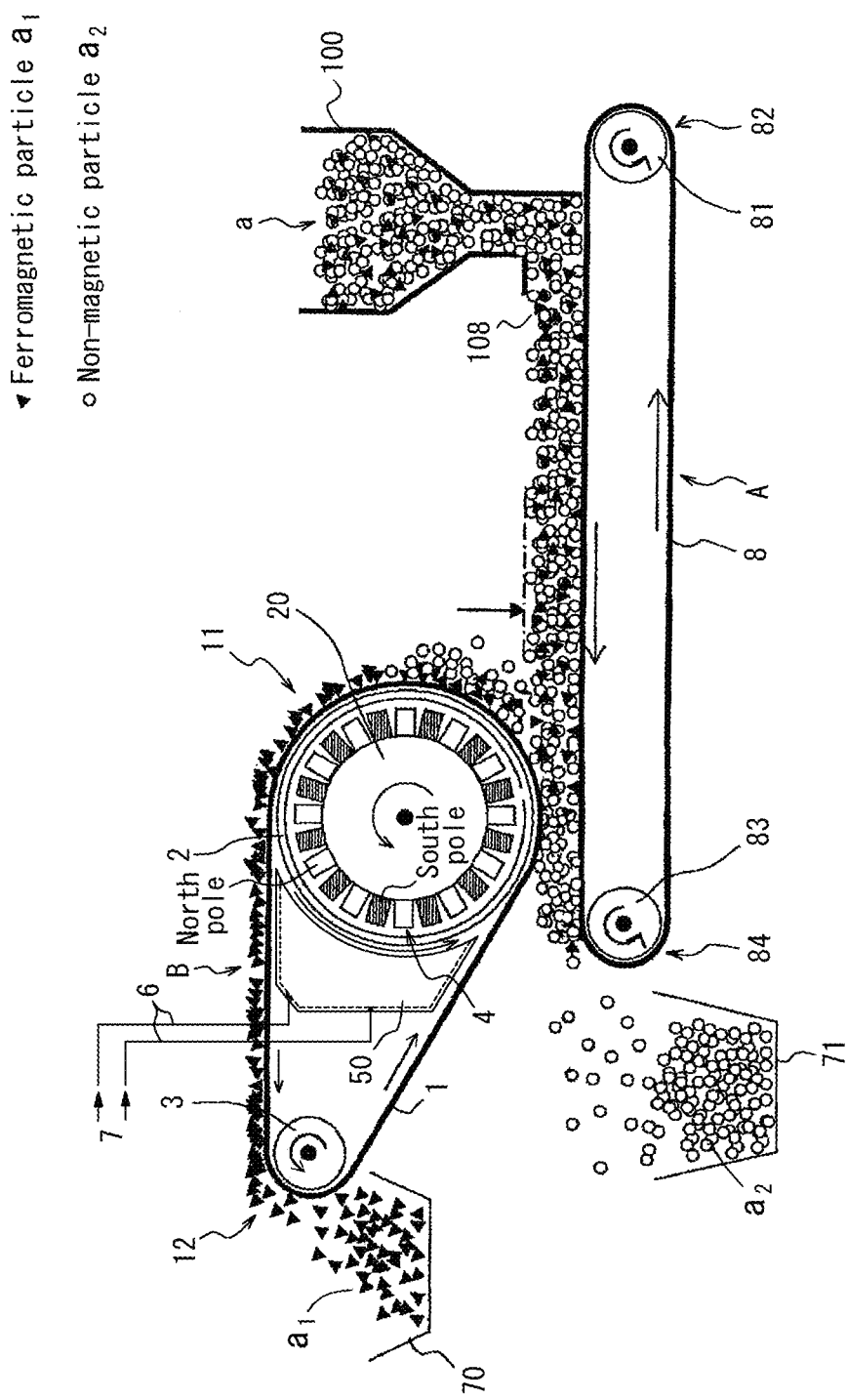
FIG. 13 is an explanatory diagram illustrating a magnetic separator according to Embodiment 6 of the present disclosure.

Embodiment 6 which is a modification of Embodiment 5 is described below, with reference to FIG. 13.

In Embodiment 6, the positional relationship between the belt conveyor A and the belt conveyor B is different from the example illustrated in FIG. 12. The conveyor start portion 11 of the belt conveyor B is located near and above the conveyor end portion 84 of the belt conveyor A as in FIG. 12, but the positional relationship between the conveyor start portion 11 and end portion 12 of the belt conveyor B is reversed with respect to that in FIG. 12. As a result, the guide rolls 81 and 83 of the belt conveyor A and the guide rolls 2 and 3 of the belt conveyor B rotate in the same direction, and the conveyor belts 1 and 8 move in opposite directions in the conveyor end portion 84 of the belt conveyor A and the conveyor start portion 11 of the belt conveyor B.

Such an arrangement equally ensures the separation of the ferromagnetic particles. The structures other than the positional relationship between the belt conveyors A and B are approximately the same as those in Embodiment 5 illustrated in FIG. 12, and so their description is omitted.

Embodiment 7

Embodiment 7 which is another modification of Embodiment 5 is described below, with reference to FIG. 14.

In Embodiment 7, the guide roll 2 is a sleeve body that is hollow inside, and is rotatably supported. The magnet roll 20 including the plurality of magnets 4 arranged at predetermined intervals is provided inside the guide roll 2, in the circular arc portion of the inner peripheral surface of the guide roll in contact with the conveyor belt.

The guide roll 2 in Embodiment 7 differs from the guide roll 2 in Embodiment 5 in that the magnet roll 20 including the magnets 4 is stationary. In other words, the magnets 4 are non-rotating stationary magnets installed independently of the guide roll 2. The magnets 4 are arranged so that magnetic poles adjacent in the roll circumferential direction are different and magnetic poles adjacent in the roll width direction are the same, as illustrated in FIG. 14.

Figure 14:
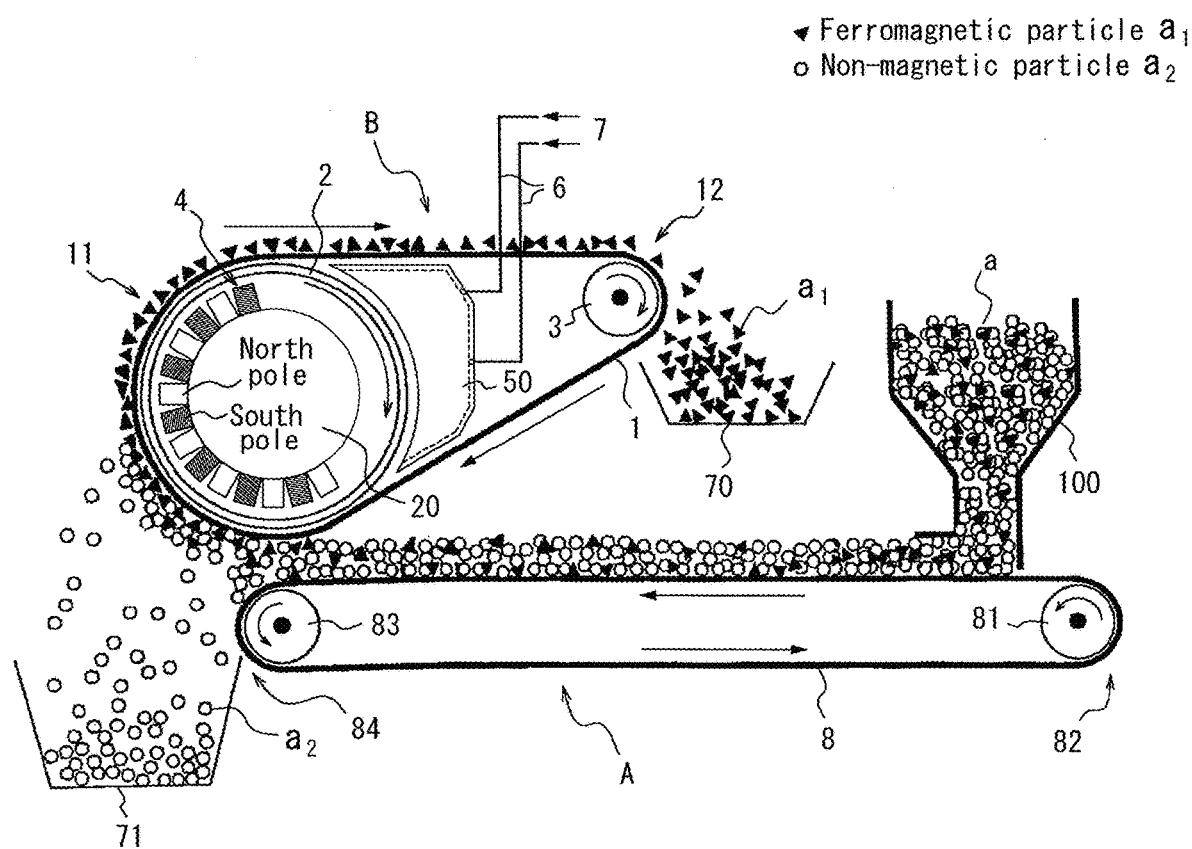
FIG. 14 is an explanatory diagram illustrating a magnetic separator according to Embodiment 7 of the present disclosure.

In Embodiment 7, the range of the installation of the magnets 4 in the roll circumferential direction is at least about 1800 (half around the magnet roll 20) from the lower end position of the magnet roll 20 (the position facing the conveyor end portion 84 of the belt conveyor A) to the top position of the magnet roll 20, as illustrated in FIG. 14. Thus, in the case where the magnets 4 are stationary and non-rotating, the installation range of the magnets 4 can be reduced.

In the magnetic separator according to Embodiment 7, the ferromagnetic particles in the powdery and/or granular material a are attracted by the stationary magnets 4, and the powdery and/or granular material a (or part of the material a) in a form that the ferromagnetic particles embrace the non-magnetic particles is carried by the conveyor belt 1 while adhering to (and held by) the lower surface of the belt conveyor B. With this device, too, although the effect is lower than that of the magnet roll 20 in FIG. 12, the ferromagnetic particles in the powdery and/or granular material a are subjected to the action of the magnetic force of the magnets 4, and the magnetic field changes as strong→weak→strong→weak→ . . . in the process of carrying the powdery and/or granular material a by the conveyor belt 1, so that the effect on the ferromagnetic particles in the powdery and/or granular material a alternates as gather→disperse→gather→disperse→ . . . . The ferromagnetic particles can thus be separated. Here, since the magnetic field does not change as fast as the magnet roll 20 in FIG. 12, the magnetic separation performance and the processing speed are lower than those in Embodiment 5 illustrated in FIG. 12.

The magnetic separator according to Embodiment 7 has the following functional effects: (i) Since a basic system of subjecting the powdery and/or granular material a discharged from the first belt conveyor A to the action of the magnetic field of the magnets 4 in the second belt conveyor B from above to attract the ferromagnetic particles in the powdery and/or granular material a and move the ferromagnetic particles toward the belt conveyor B is employed, the embracement and enfoldment of the non-magnetic particles by the ferromagnetic particles can be reduced as compared with the conventional device; and (ii) The enfoldment and embracement of the non-magnetic particles by the ferromagnetic particles can be resolved by the magnetic field change by the magnets 4.

Figure 15:
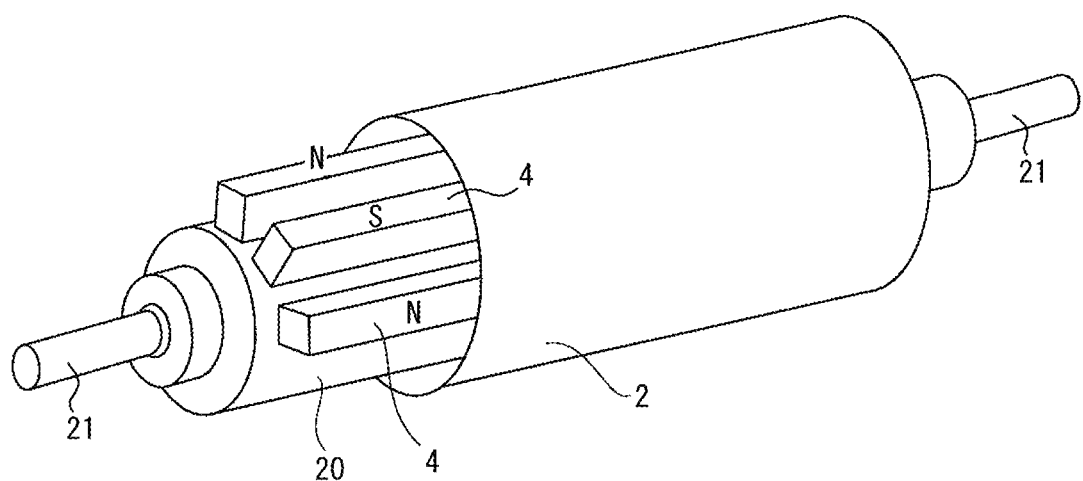
FIG. 15 is a perspective diagram illustrating the structure of another magnet roll according to the present disclosure.

FIG. 15 is a perspective diagram illustrating the structure of the magnet roll 2 in Embodiment 7 illustrated in FIG. 14. As illustrated in FIG. 15, a plurality of magnets 4 are arranged along the circumferential direction of the magnet roll 20 so that the magnetic poles alternate in the circumferential direction as in FIG. 6, but each magnet in the roll axial direction is one continuous magnet. This magnet roll 20 is stationary and non-rotating.

Embodiment 8

Embodiment 8 which is a modification of the shield wall 50 is described below, with reference to FIG. 16. The side portion of the shield wall 50 in Embodiment 2 illustrated in FIG. 9 may be extended to cover approximately half the end surface of the guide roll 2, as illustrated in FIG. 16.

Figure 16:
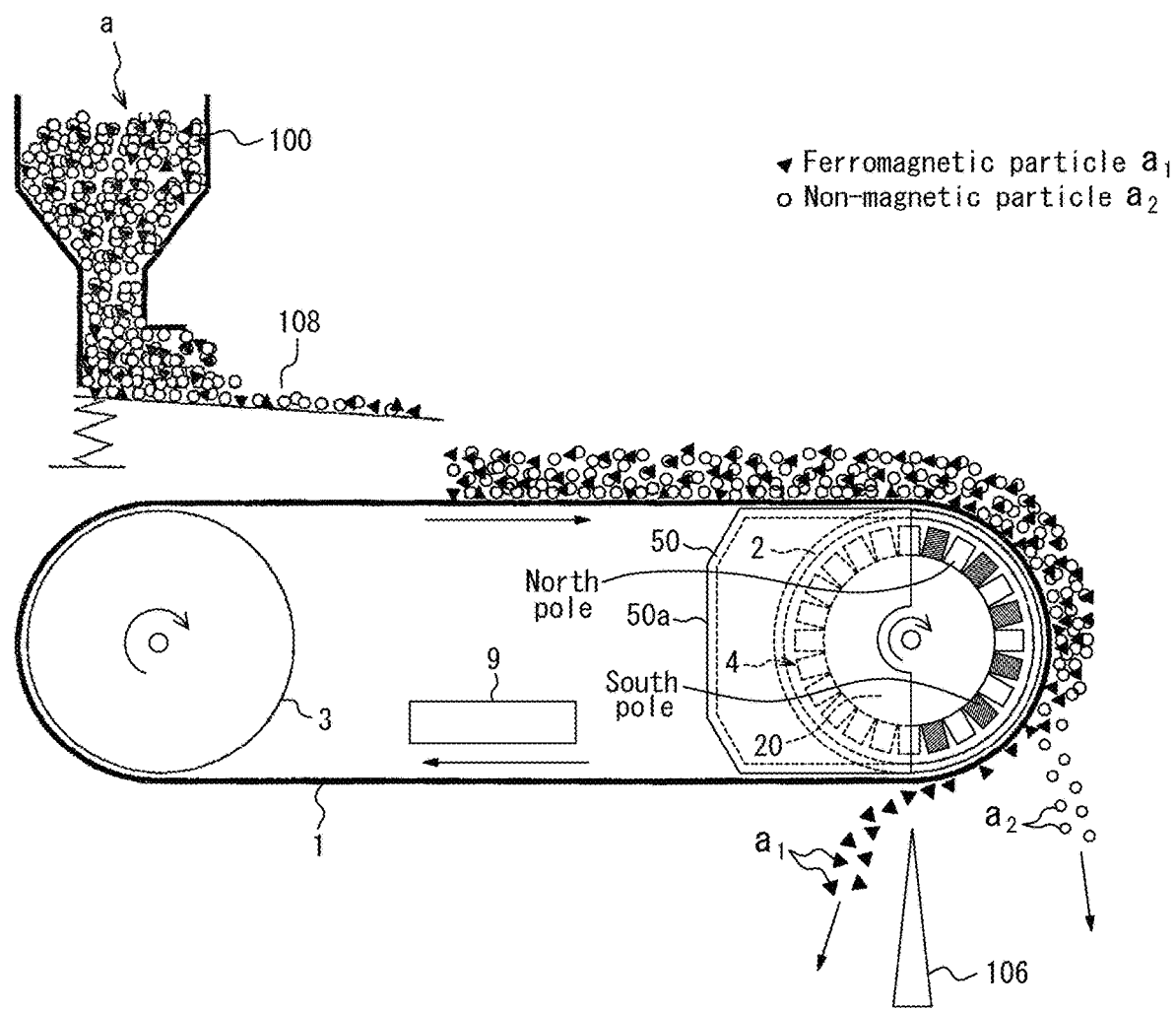
FIG. 16 is an explanatory diagram illustrating a magnetic separator according to Embodiment 8 of the present disclosure.

Moreover, an auxiliary device 9 may be provided in the inside space of the conveyor belt 1 between the pair of guide rolls 2 and 3, as illustrated in FIG. 16. The auxiliary device 9 jets air toward the space, or sucks air from the space. By collecting the ferromagnetic particles that have impinged on the shield wall 50 by the auxiliary device 9, not only the adhesion of the ferromagnetic particles to the guide roll 2 can be effectively prevented, but also the adhesion of the ferromagnetic particles to the other guide roll 3 can be effectively prevented. Any of various types of shield walls described above may be provided for the guide roll 2, in order to prevent the adhesion of the ferromagnetic particles to the guide roll 2.

EXAMPLES

Example 1

Magnetic separation was performed on steelmaking slag using the magnetic separator according to Embodiment 1 illustrated in FIG. 5.

After putting a ground product of the steelmaking slag through a 400 μm sieve, slag passed through the sieve was set as a powdery and/or granular material to be magnetically separated. The iron concentration of the powdery and/or granular material was 54 mass %. The supply layer thickness of the powdery and/or granular material onto the conveyor belt 1 was 7 mm. The outer diameter of the magnet roll 2 was 200 mm, the number of magnetic poles of the magnets 4 was 12 (a pair of a north pole and a south pole being counted as one magnetic pole), the feed speed of the conveyor belt 1 was 0.5 m/s, the rotational speed of the magnet roll 20 was 31.9 rpm, and the magnetic field strength in the conveyor belt portion in contact with the magnet roll 20 was 0.2 T. To investigate the effect of the rotational speed of the magnet roll 20, the rotational speed of the magnet roll 20 was set to 100 rpm (magnetic field change frequency F=20 Hz), 150 rpm (magnetic field change frequency F=30 Hz), 500 rpm (magnetic field change frequency F=100 Hz), 850 rpm (magnetic field change frequency F=170 Hz), and 1200 rpm (magnetic field change frequency F=240 Hz).

The shield wall 5 was made of resin, and was 100 mm in thickness. The magnetic force at the back surface 5a of the shield wall 5 was 100 gauss or less.

For comparison, the same powdery and/or granular material of the steelmaking slag was magnetically separated at a feed speed of 0.5 m/s, using a magnetic drum separator X (the magnetic field strength on the drum surface: 0.16 T) and a magnetic pulley Y (the magnetic field strength in the conveyor belt portion in contact with the guide roll: 0.2 T) which have been commonly used conventionally.

In each example, the iron concentration of the recovered magnetically attracted matter and the iron recovery rate from the slag were examined. Moreover, the adhesion amount of the iron powder to the guide roll was investigated. The adhesion amount of the iron powder was compared between the case where the shield wall 5 was installed and the case where the shield wall 5 was not installed.

In the case of using the magnetic drum separator X, the iron concentration of the recovered magnetically attracted matter was low because the non-ferrous component was also caught, and also the iron recovery rate was low because iron escaped to the non-magnetically attracted side. In the case of using the magnetic pulley Y, almost the whole powdery and/or granular material was caught, and so the recovery rate was high. However, the important iron concentration of the recovered magnetically attracted matter was almost the same as that of the powdery and/or granular material before the magnetic separation.

In Example according to the present disclosure, on the other hand, both the iron concentration of the recovered magnetically attracted matter and the iron recovery rate of the slag were high. Particularly when the magnetic field change frequency of the magnet roll 2 was 30 Hz or more, both the iron concentration of the recovered magnetically attracted matter and the iron recovery rate of the slag were higher.

The adhesion amount of the iron powder in the above-mentioned operation was compared between the case where the shield wall 5 was installed and the case where the shield wall 5 was not installed. As a result, while the adhesion amount was 100 g/h in the case where the shield wall 5 was not installed, the adhesion amount was reduced to 0.5 g/h or less in the case where the shield wall 5 was installed.

The same operation was performed with regard to the respective shield walls in Embodiments 2 to 4. As a result, while the adhesion amount was 100 g/h in the case where the shield wall 5 or the shield wall 50 (the distance from the magnet roll 2 to the back surface 5a of the shield wall 5: 100 mm) was not installed, the adhesion amount was reduced to 0.5 g/h or less in the case where the shield wall 5 was installed. Further, when the shield wall 5 or the shield wall 50 is supplied with air at 5 MPa, the adhesion amount of the iron powder was reduced to 0.3 g/h or less.

Example 2

Magnetic separation was performed on steelmaking slag using the magnetic separator according to Embodiment 5 illustrated in FIG. 11.

After putting a ground product of the steelmaking slag through a 400 μm sieve, slag passed through the sieve was set as a powdery and/or granular material to be magnetically separated. The iron concentration of the powdery and/or granular material was 54 mass %. The supply layer thickness of the powdery and/or granular material onto the conveyor belt 1 of the belt conveyor A was 7 mm. The outer diameter of the guide roll 3 of the belt conveyor B was 300 mm, the number of magnetic poles of the magnet roll 20 was 12 (a pair of a north pole and a south pole being counted as one magnetic pole), the feed speed of the conveyor belt of each of the belt conveyors A and B was 0.5 m/s, the rotational speed of the magnet roll 02 was 31.9 rpm, and the magnetic field strength in the conveyor belt portion in contact with the magnet roll 20 was 0.2 T. To investigate the effect of the rotational speed of the magnet roll 20 of the belt conveyor B, the rotational speed of the magnet roll 20 was set to 100 rpm (magnetic field change frequency F=20 Hz), 150 rpm (magnetic field change frequency F=30 Hz), 500 rpm (magnetic field change frequency F=100 Hz), 850 rpm (magnetic field change frequency F=170 Hz), and 1200 rpm (magnetic field change frequency F=240 Hz).

The shield wall 5 was made of resin, and was 100 mm in thickness. The magnetic force at the back surface 5a of the shield wall 5 was 100 gauss or less.

For comparison, the same powdery and/or granular material of the steelmaking slag was magnetically separated at a feed speed of 0.5 m/s, using a magnetic drum separator X (the magnetic field strength on the drum surface: 0.16 T) and a magnetic pulley Y (the magnetic field strength in the conveyor belt portion in contact with the guide roll: 0.2 T) which have been commonly used conventionally.

In each example, the iron concentration of the recovered magnetically attracted matter and the iron recovery rate from the slag were examined. Moreover, the adhesion amount of the iron powder to the magnet roll was investigated. The adhesion amount of the iron powder was compared between the case where the shield wall 5 was installed and the case where the shield wall 5 was not installed.

In the case of using the magnetic drum separator X, the iron concentration of the recovered magnetically attracted matter was low because the non-ferrous component was also caught, and also the iron recovery rate was low because iron escaped to the non-magnetically attracted side. In the case of using the magnetic pulley Y, almost the whole powdery and/or granular material was caught, and so the iron recovery rate was high. However, the important iron concentration of the recovered magnetically attracted matter was almost the same as that of the powdery and/or granular material before the magnetic separation.

In Example according to the present disclosure, on the other hand, both the iron concentration of the recovered magnetically attracted matter and the iron recovery rate of the slag were high. Particularly when the magnetic field change frequency of the magnet roll 2 was 30 Hz or more, both the iron concentration of the recovered magnetically attracted matter and the iron recovery rate of the slag were higher.

The adhesion amount of the iron powder in the above-mentioned operation was compared between the case where the shield wall 5 was installed and the case where the shield wall 5 was not installed. As a result, while the adhesion amount was 100 g/h in the case where the shield wall 5 was not installed, the adhesion amount was reduced to 0.5 g/h or less in the case where the shield wall 5 was installed.

REFERENCE SIGNS LIST 1, 8 conveyor belt
2 guide roll
3, 81, 83 guide roll
4 magnet
9 auxiliary device
11, 82 conveyor start portion
12, 84 conveyor end portion
20 magnet roll
21, 22 rotational shaft
23 bearing
70 magnetically attracted matter recovery portion
71 non-magnetically attracted matter recovery portion
100 supply device
106 partition plate
A, B belt conveyor
a powdery and/or granular material
k gap portion

The invention claimed is:

1. A magnetic separator comprising:
a first pair of guide rolls; and
a first conveyor belt that extends between the first pair of guide rolls, and conveys a powdery and/or granular material containing ferromagnetic particles,
wherein one guide roll of the first pair of guide rolls is a hollow roll, and includes, in a hollow part thereof, a magnet roll including a plurality of magnets that are arranged along an inner peripheral surface of the guide roll in lines at intervals so that different magnetic poles alternate in a circumferential direction, and the magnetic separator further comprises
a shield wall that covers a circular arc region of an outer peripheral surface of the guide roll except a circular arc region around which the first conveyor belt is wound, to block magnetic lines of force from the plurality of magnets, and wherein
a thickness of the shield wall is 30 mm or more and the shield wall is made of a non-metallic material.

2. The magnetic separator according to claim 1, further comprising:
a second pair of guide rolls; and
a second conveyor belt that is located below the first conveyor belt, and conveys the powdery and/or granular material containing the ferromagnetic particles, the second conveyor belt extending between the second pair of guide rolls,
wherein a part of the first conveyor belt corresponding to the magnet roll is located near a powdery and/or granular material conveyance downstream side of the second conveyor belt.

3. The magnetic separator according to claim 1, further comprising
at least one conduit that passes through the shield wall from a back surface thereof to a side facing the guide roll, and supplies air to a clearance between the shield wall and the guide roll.

4. The magnetic separator according to claim 1,
wherein the magnet roll is rotatable independently of the guide roll.

5. The magnetic separator according to claim 1,
wherein the magnet roll includes P pairs of a north pole and a south pole arranged side by side in the circumferential direction on a surface of the magnet roll facing the powdery and/or granular material, and
the magnet roll rotates at x rpm so that a magnetic field change frequency F (Hz) defined by the following expression (1) is 30 Hz or more and 160 Hz or less:

$$F=(x \cdot P)/60 \qquad (1).$$

6. The magnetic separator according to claim 1,
wherein magnetic poles of magnets adjacent in an axial direction of the magnet roll from among the plurality of magnets are the same.

7. The magnetic separator according to claim 1,
wherein magnetic poles of magnets adjacent in an axial direction of the magnet roll from among the plurality of magnets are different.

8. The magnetic separator according to claim 1,
wherein a rotational direction of the one guide roll and a rotational direction of the magnet roll are the same.

9. The magnetic separator according to claim 1,
wherein a rotational direction of the one guide roll and a rotational direction of the magnet roll are opposite.

10. The magnetic separator according to claim 2,
wherein a rotational direction of the first conveyor belt and a rotational direction of the second conveyor belt are the same.

11. The magnetic separator according to claim 2,
wherein a rotational direction of the first conveyor belt and a rotational direction of the second conveyor belt are opposite.

12. The magnetic separator according to claim 1,
wherein the first conveyor belt and the one guide roll are made of a non-metallic material.

13. The magnetic separator according to claim 1,
wherein any of the first pair of guide rolls is a non-drive roll.

14. A magnetic separation method of separating, from a powdery and/or granular material containing ferromagnetic particles, the ferromagnetic particles using the magnetic separator according to claim 1, the magnetic separation method comprising
supplying the powdery and/or granular material onto the first conveyor belt, with a thickness that is greater than a diameter of a smallest particle contained in the powdery and/or granular material.

15. An iron source manufacturing method of manufacturing an iron source from a by-product of a steelmaking process, using the magnetic separator according to claim 1.

16. An iron source manufacturing method of manufacturing an iron source from a by-product of a steelmaking process, using the magnetic separation method according to claim 14.

17. The magnetic separator according to claim 1,
wherein the thickness of the shield wall is 50 mm or more.

18. The magnetic separator according to claim 1,
wherein the shield wall extends across a full width of the guide roll in an axial direction of the guide roll.

* * * * *